United States Patent
Zhao et al.

(10) Patent No.: US 12,375,897 B2
(45) Date of Patent: Jul. 29, 2025

(54) MANAGEMENT OF DEFAULT DATA SUBSCRIPTION (DDS) IN MULTI-SUBSCRIBER IDENTITY MODULE DEVICES

(71) Applicant: QUALCOMM Incorporated, San Diego, CA (US)

(72) Inventors: Can Zhao, San Diego, CA (US); Suli Zhao, San Diego, CA (US); Xinchen Zhang, San Diego, CA (US); Reza Shahidi, La Jolla, CA (US); Arnaud Meylan, San Diego, CA (US); Liping Shen, San Diego, CA (US); Ajith Tom Payyappilly, San Diego, CA (US); Juan Zhang, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/414,995

(22) Filed: Jan. 17, 2024

(65) Prior Publication Data
US 2024/0155326 A1    May 9, 2024

Related U.S. Application Data

(62) Division of application No. 17/447,035, filed on Sep. 7, 2021, now Pat. No. 11,910,479.

(51) Int. Cl.
*H04W 8/18* (2009.01)
*H04M 1/72448* (2021.01)

(52) U.S. Cl.
CPC ......... *H04W 8/18* (2013.01); *H04M 1/72448* (2021.01)

(58) Field of Classification Search
CPC ..... H04W 8/18; H04W 8/183; H04W 60/005; H04M 1/72448
See application file for complete search history.

(56) References Cited

U.S. PATENT DOCUMENTS

| | | | |
|---|---|---|---|
| 8,406,741 B2 | 3/2013 | Kang et al. | |
| 2013/0273971 A1 | 10/2013 | Adamietz | |
| 2018/0132289 A1* | 5/2018 | Zhao | H04W 76/16 |
| 2022/0295343 A1 | 9/2022 | Pefkianakis et al. | |
| 2022/0353774 A1 | 11/2022 | Agarwal et al. | |
| 2023/0071751 A1 | 3/2023 | Zhao et al. | |
| 2023/0224690 A1* | 7/2023 | Yukimasa | H04M 11/00 455/419 |

* cited by examiner

*Primary Examiner* — Marisol Figueroa
(74) *Attorney, Agent, or Firm* — Haynes and Boone, LLP

(57) ABSTRACT

A method of wireless communication performed by a user equipment (UE) includes: operating in a Dual SIM Dual Active (DSDA) mode or a Dual SIM Dual Standby (DSDS) mode in which a first subscriber identity module (SIM) is designated as a default data subscription (DDS); determining a recommendation to change the DDS from the first SIM to a second SIM at a modem; informing a user of the recommendation to change the DDS; changing the DDS in response to, at least in part, the recommendation and an input from the user; updating a first state variable to indicate a state of the DDS; and routing internet data to the second SIM.

16 Claims, 16 Drawing Sheets

MANAGEMENT OF DEFAULT DATA SUBSCRIPTION (DDS) IN MULTI-SUBSCRIBER IDENTITY MODULE DEVICES

CROSS-REFERENCE TO RELATED APPLICATIONS

The present application is a divisional of U.S. patent application Ser. No. 17/447,035, filed on Sep. 7, 2021, the disclosure of which is hereby incorporated herein by reference in its entirety.

TECHNICAL FIELD

This application relates to wireless communication systems, and more particularly to management of Default Data Subscription (DDS) in multi-subscriber identity module (MultiSim) devices.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Furthermore, as wireless communication becomes cheaper and more reliable, expectations among consumers change. Some UE manufacturers are responding to consumer preferences by including multiple subscriber identity modules (SIMs) within UEs.

However, including multiple SIMs within a device may lead to scenarios in which it is desired to use one subscription for the majority of data use, versus another subscription. There is a need in the art for techniques to manage the data use of multiple subscriptions in multi-SIM devices.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes: operating in a Dual SIM Dual Active (DSDA) mode or a Dual SIM Dual Standby (DSDS) mode in which a first subscriber identity module (SIM) is designated as a default data subscription (DDS); determining a recommendation to change the DDS from the first SIM to a second SIM at a modem; informing a user of the recommendation to change the DDS; changing the DDS in response to, at least in part, the recommendation an input from the user; updating a first state variable to indicate a state of the DDS; and routing internet data to the second SIM.

In an additional aspect of the disclosure, a user equipment (UE) includes: a first subscriber identity module (SIM) and a second SIM; means for operating in a Dual SIM Dual Active (DSDA) mode or a Dual SIM Dual Standby (DSDS) mode in which the first SIM is designated as a default data subscription (DDS); and means for performing a temporary DDS switch; means for sending a permanent DDS switch recommendation during a duration of the temporary DDS switch; means for receiving a permanent DDS switch request from a processor of the UE; and means for converting the temporary DDS switch into a permanent DDS switch in response to the permanent DDS switch request.

In an additional aspect of the disclosure, a non-transitory computer-readable medium having program code recorded thereon for wireless communication by a UE, the program code includes: code for operating in a Dual SIM Dual Active (DSDA) mode or a Dual SIM Dual Standby (DSDS) mode in which a first subscriber identity module (SIM) is designated as a default data subscription (DDS); and code for consolidating a plurality of switch recommendations from a modem of the UE to a processor of the UE.

In an additional aspect of the disclosure, a UE includes a first subscriber identity module (SIM) associated with a first service provider subscription and a second SIM associated with a second service provider subscription; a modem configured to interface with a base station; and a processor configured to interface with the modem and to access the first SIM and the second SIM, wherein the modem is further configured to:
  operate in a Dual SIM Dual Active (DSDA) mode or a Dual SIM Dual Standby (DSDS) mode in which the first SIM is designated as a default data subscription (DDS); and perform a temporary DDS switch; receive a permanent DDS switch request from the processor; and reject the permanent DDS switch request.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
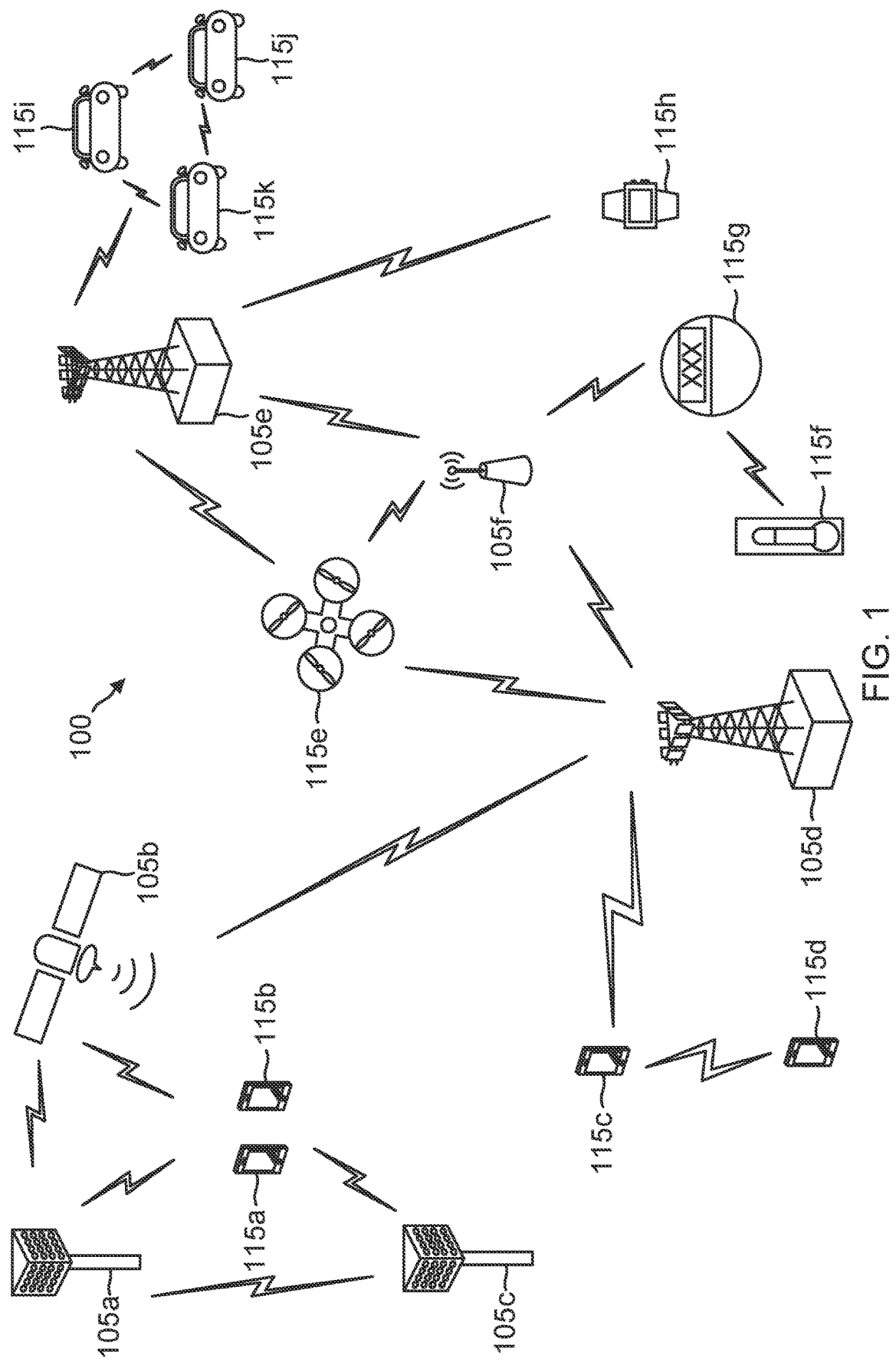
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into two different frequency ranges, a frequency range one (FR1) and a frequency range two (FR2). FR1 bands include frequency bands at 7 GHz or lower (e.g., between about 410 MHz to about 7125 MHz). FR2 bands include frequency bands in mmWave ranges between about 24.25 GHz and about 52.6 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In certain aspects, a wireless communication device or UE is a multiple SIM (MultiSim) device capable of utilizing multiple subscriptions for communication with one or more networks. For instance, the UE may include two SIMs, a first SIM for a first subscription and a second SIM for a second subscription. In some instances, the first and second subscriptions may be provided by the same operator. For example, the first subscription and the second subscription may correspond to different user accounts and/or services on the same operator network. In other instances, the first and second subscriptions may be provided by different operators. In any case, in certain scenarios, the UE may communicate using the first subscription and/or the second subscription. In some instances, the UE may operate in a dual-SIM dual-standby (DSDS) mode, where both subscriptions can be on standby (in an idle mode) waiting to begin communications. However, when a communication or network connection is established on one SIM (e.g., the first subscription), the other SIM (e.g., the second subscription) is no longer active. That is, one SIM may be active at a given time. The DSDS mode may be suitable for UEs that are equipped with a single transceiver and/or radio frequency (RF) chain which can either be utilized by the first subscription or the second subscription. In other instances, the UE may operate in a dual-SIM dual-active (DSDA) mode, where the UE may simultaneously connect to the same network or different networks via the first SIM and the second SIM. To operate in the DSDA mode, the UE may have separate transceiver and/or RF chains or resources for the first SIM and the second SIM. In the present disclosure, an operation or communication performed via a SIM may refer to an operation or communication performed for a wireless service subscription associated with the SIM (where the subscription information for the wireless service is stored).

For a multi-SIM device, one of the SIMs/subscriptions carries the internet data traffic, and it is referred to as the default data subscription (DDS) The other subscription— nDDS—is mainly used for voice and short message service (SMS). The user chooses which subscription is the DDS, and the user may change the DDS through a user interface (UI) of the UE. When the user changes the DDS from one subscription to another, the UE may perform a permanent DDS switch to switch the DDS to the subscription selected by the user.

For a multi-SIM device, when the non-default data subscription (nDDS) is handling a voice call, the radio resources may be occupied by nDDS. Thus, the DDS may not be able to send or receive data, so internet traffic cannot go through the DDS. To continue the user internet traffic, when the voice call is started on nDDS, the UE may perform a temporary DDS switch, so that the internet traffic is temporarily switched to the same subscription as is handling the voice call, thereby facilitating internet traffic.

Some modems have smart features to recommend a DDS switch based on modem status. For example, a modem may have logic that determines that the nDDS subscription has better throughput, and thus recommends doing a permanent DDS switch. In fact, the modem may recommend a permanent DDS switch or a temporary DDS switch, depending on its state and how its logic is programmed. Nevertheless, the application processor (AP) may still make any final decision to trigger a DDS switch. After receiving a modem DDS switch recommendation, an AP may have its own logic to decide whether to follow the modem's recommendation. Furthermore, in some UEs, the AP may trigger a DDS switch even without a modem recommendation. In the examples herein, when a modem sends a recommendation to an AP to perform a DDS switch, that is referred to as a "recommendation," and when an AP directs a modem to perform a DDS switch, that is referred to as a switch "request."

In various implementations, a permanent DDS switch may be presented to a user as an option by a UI of the UE. For instance, a modem may make a recommendation to perform a DDS switch, and the operating system on the AP may employ the UI to inform the user of the proposed switch and to provide the user with a choice to either go ahead with the UI switch or not. A user may decide to go ahead with the switch based on any factor, including subscription costs, data caps, or any other factors that are important to the user. If the user does go ahead and accept the permanent DDS switch, the modem may then exchange signaling messages with the network about the UE's capabilities. In other words, the modem may not be able to have full capabilities on both subscriptions simultaneously even in a DSDA modem, and the UE may inform the network about those capabilities. Now looking at a temporary DDS switch, various implementations also propose to provide the user with a UI-based option to either go ahead with the switch or not. If a user decides to go ahead with the temporary DDS switch, in some instances the modem may omit to exchange signaling messages with the network about its capabilities because it is assumed that the DDS switch is only temporary and may be switched back upon a certain event, such as a voice call ending.

Furthermore, various implementations track DDS states and changes using state variables. Such state variables are described in more detail with respect to FIGS. 4-8. An advantage of such implementations is that they may efficiently track and manage DDS states while at the same time providing a user with choices that may affect the user's experience.

Allowing DDS switches, both permanent and temporary, may cause some issues to arise. For instance, back-to-back temporary and permanent DDS switch recommendations may result in unresolved switch recommendations or unnecessary switching. Furthermore, modem rejection of permanent DDS switching during a temporary DDS switch may also result in unresolved switch recommendations. Other issues include inefficiencies that may be a result of DDS switching back-and-forth after a voice call ends. Various implementations discussed herein provide techniques to manage DDS states in a system that includes both temporary and permanent DDS switches.

For instance, one implementation includes recommendation consolidation, such that a UE may consolidate temporary and permanent DDS switch recommendations to avoid back-to-back DDS switch recommendations and DDS switch requests as well as to avoid modem rejection of a permanent DDS switch during temporary DDS switch. Another implementation includes DDS switch request handling, including allowing a modem to be able to handle temporary DDS switch requests and permanent DDS switch requests from the AP properly at any time. For instance, an AP may trigger a permanent DDS switch during a temporary DDS switch, and the modem will be able to handle it, and this may also help to avoid DDS switching back-and-forth after a voice call ends.

Various implementations may include advantages. For instance, implementations providing for recommendation consolidation or DDS switch request handling may help a UE to operate more efficiently by avoiding unresolved states and excessive switching.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support communications with ultra-reliable and redundant links for devices, such as the UE 115e, which may be airborne. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-action-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such asV2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105.

Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, a UE 115 may be capable of utilizing multiple subscriber identity modules (SIMs) and may operate in both a DSDA and DSDS mode and may manage DDS switches and states, as explained in more detail below.

Figure 2:
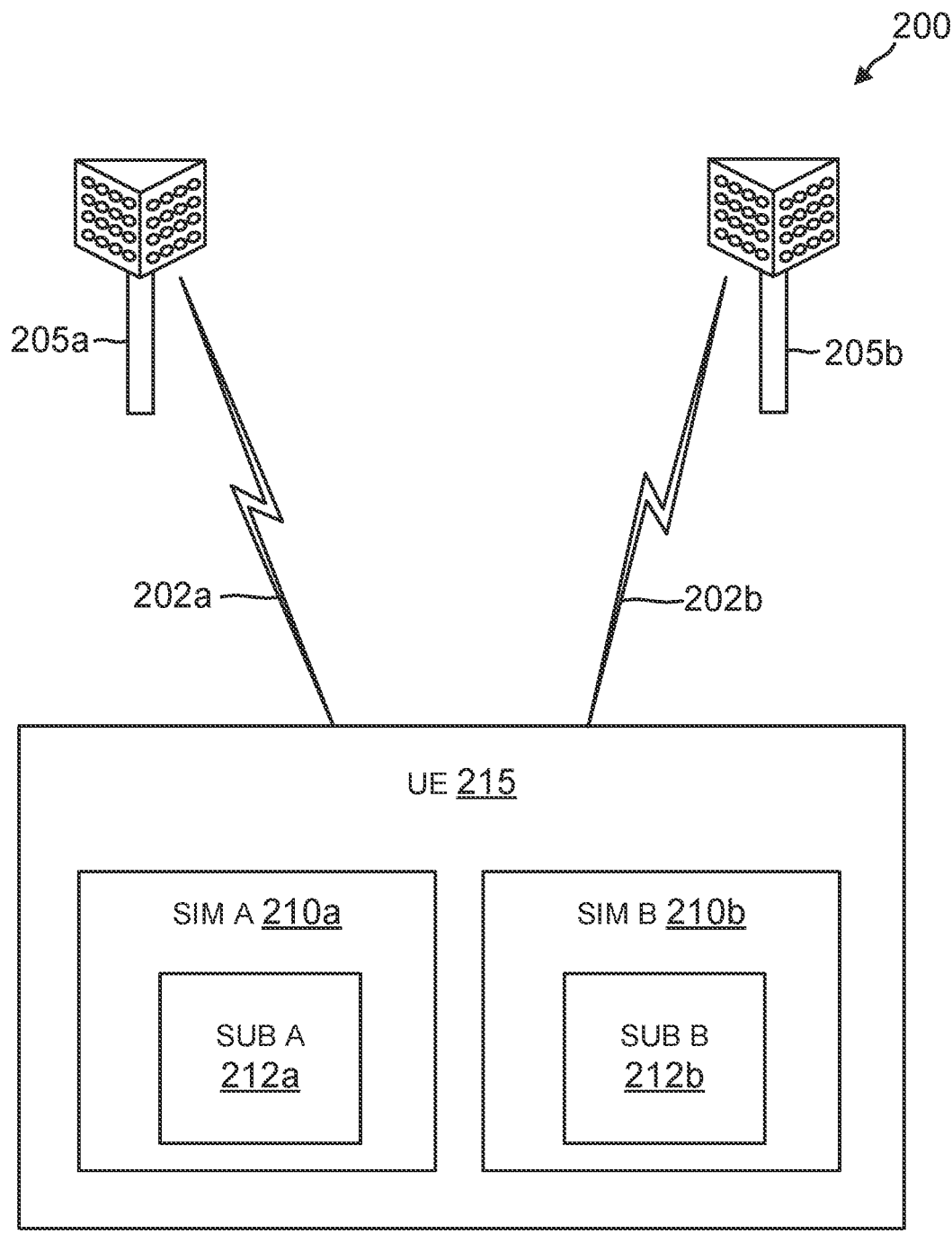
FIG. 2 illustrates a communication scenario utilizing multiple subscriptions according to some aspects of the present disclosure.

FIG. 2 illustrates a communication scenario 200 that utilizes multiple subscriptions according to some aspects of the present disclosure. The communication scenario 200 may correspond to a communication scenario among BSs 105 and or UEs 115 in the network 100. For simplicity, FIG. 2 illustrates two BSs 205 (shown as 205*a* and 205*b*) and one UE 215, but a greater number of UEs 215 (e.g., the about 3, 4, 3, 6, 7, 8, 9, 10, or more) and/or BSs 205 (e.g., the about 3, 4 or more) may be supported. The BS 205 and the UEs 215 may be similar to the BSs 105 and the UEs 115, respectively.

In the scenario 200, the UE 215 is capable of utilizing multiple SIMs (e.g., SIM cards) for communication with one or more networks. For simplicity, FIG. 2 illustrates the UE 215 including two SIMs 210 (shown as SIM A 210*a* and SIM B 210*b*), but the UE 215 may include more than two SIMs (e.g., about 3, 4 or more). In some aspects, each SIM 210 may include integrated circuits and/or memory configured to store information used for accessing a network, for example, to authenticate and identify the UE 215 as a subscriber of the network. Some examples of information stored at the SIM A 210*a* and/or SIM B 210*b* may include, but not limited to, a subscriber identity such as an international mobile subscriber identity (IMSI) and/or information and/or key used to identify and authenticate the UE 215 in a certain provider network. As an example, the UE 215 may subscribe to a first operator and a second operator. That is, the UE 215 may have a first subscription 212*a* (shown as SUB A) with the first operator and a second subscription 212*b* (shown as SUB B) with the second operator. Accordingly, the SIM A 210*a* may store or maintain information for accessing a network of the first operator based on the first subscription 212*a*, and the SIM B 210*b* may store information for access a network of the second operator based on the second subscription 212*b*. In some instances, the first operator and the second operator may correspond to the same operator. For example, the first subscription 212*a* and the second subscription 212*b* may correspond to different user accounts and/or services subscribed with the same operator. In other instances, the first operator may be different from the second operator.

In operation, the UE 215 may communicate with a BS 205*a* (operated by the first operator) using the SIM A 210*a* via a radio link 202*a*. Further, the UE 215 may communicate with a BS 205*b* (operated by the second operator) using the SIM B 210*b* via a radio link 202*b*. In some aspects, the UE 215 may use the same radio access technology (e.g., NR or NR-U) for communication with the BS 205*a* and the BS 205*b*. In other aspects, the UE 215 may use one radio access technology (e.g., NR or NR-U) for communication with the BS 205a and another radio access technology (e.g., LTE) for communication with the BS 205b. Although FIG. 2 illustrates the UE 215 communicates with different BSs 205 using the SIM A 210a and the SIM B 210b, it should be understood that in other examples the UE 215 may communicate with the same BS. For instance, the UE 215 may communicate with the same BS 205a for the first subscription 212a via the SIM A 210a and for the second subscription 212b via the SIM B 210b.

In some aspects, the UE 215 may operate in a DSDS mode, where both SIMs 210a and 210b can be on standby (in an idle mode) waiting to begin communications. When a communication is established on one SIM (e.g., the SIM A 210a), the other SIM (e.g., the SIM B 210b) is no longer active. That is, one SIM may be active at a given time. For instance, both SIMs 210 may share a single transceiver and/or RF chain at the UE 215 for communications with corresponding network(s). In other aspects, the UE 215 may operate in a DSDA mode, where the UE 215 may simultaneously connect to the same network or different networks via the SIM A 210a and the SIM B 210b. That is, both SIM A 210a and SIM B 210b may have active communications at the same time. For instance, the UE 215 may have multiple transceiver and/or RF chains, where each of the SIM A 210a and the SIM B 210b may utilize one of the transceiver and/or RF chains at the same time for concurrent communications.

In some aspects, the radio link 202a between the UE 215 and the BS 205a and the radio link 202b between the UE 215 and the BS 205b may be over orthogonal bands such as FR1/FR2 or low band/high band FR1. Of course, any combination of radio links 202 is possible, and the radio links may even take place using different radio access technologies. For instance, radio link 202 a may carry communications according to 5G protocols, whereas radio link 202b may carry communications according to LTE protocols. Furthermore, UE 215 may manage DDS switches and states to make SIM 210a the DDS or to make SIM 210b the DDS, according to the techniques described below with respect to FIGS. 3-14.

Figure 3:
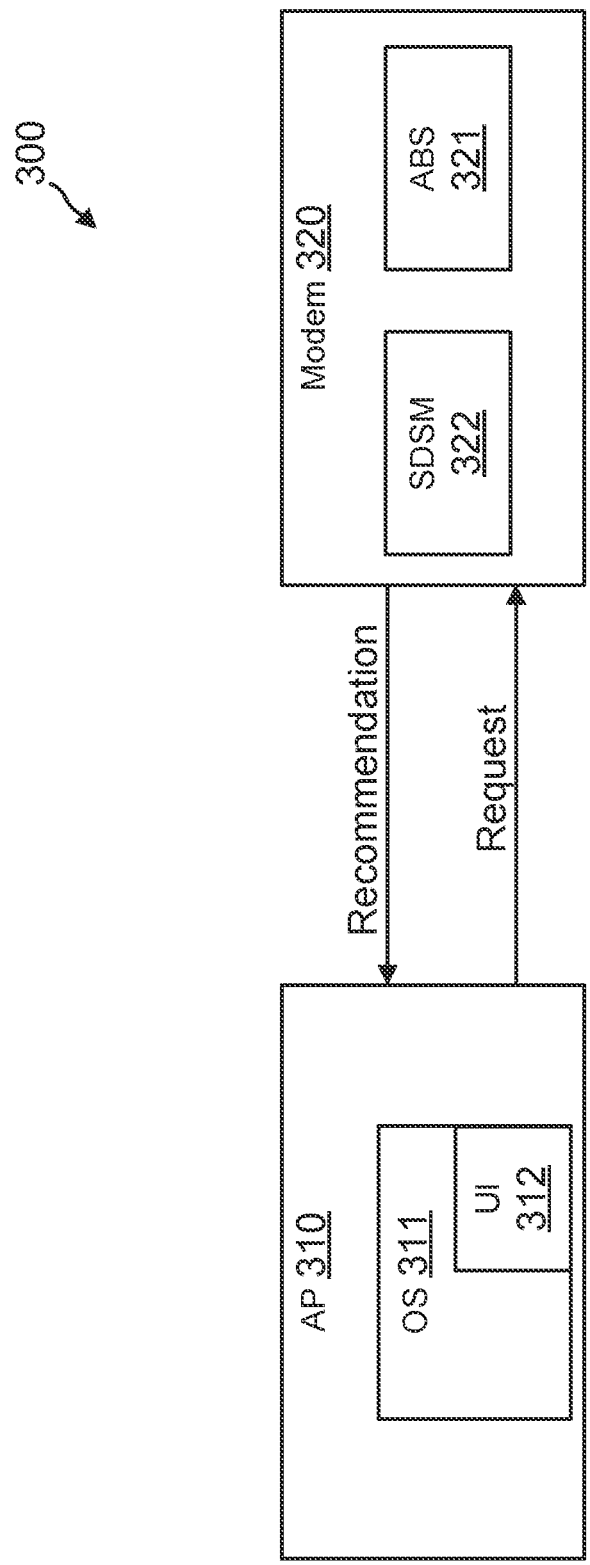
FIG. 3 is a block diagram of a relationship between an application processor and a modem within the UEs of FIGS. 1-2, according to some aspects of the present disclosure.

FIG. 3 illustrates an example relationship between an AP 310 and a modem 320, within an example UE (e.g., UE 115, 215), according to one implementation. The AP 310 may include a microprocessor, such as a general-purpose processor, a digital signal processor, an application-specific integrated circuit, and/or the like. In one example, the AP 310 includes a reduced instruction set computer (RISC) processor suitable for mobile devices. Operating system (OS) 311 is an operating system, such as the operating system known as Android™, and it runs on AP 310. The user interface (UI) 312 is a user interface application that runs on the OS 311. The UI 312 may provide visual, audio, haptic, or other kinds of information to a user through any appropriate interface device. Furthermore, the scope of implementations is not limited to any type of processor or any operating system. As explained in more detail below, AP 310 includes software and/or hardware logic to switch a DDS state and to track a DDS state.

Modem 320 may include a physical hardware device that includes logic to modulate and demodulate information between the AP 310 and RF devices, such as mixers, amplifiers, and antennas (not shown). Furthermore, in this example, modem 320 includes logic to make recommendations to switch a DDS state and also logic to track a DDS state.

The implementation of FIG. 3 includes software and/or hardware logic modules 321, 322. In this example, smart DDS switching module (SDSM) 322 receives the DDS switch recommendation from the application-based subscription component (ABS) 321 and notifies it to the OS 311 upper layers, which then goes to the UI 312. SDSM 322 also handles the request commands coming back from the UI 312, and takes care of the routing on the AP with respect to whether the data should go through the first subscription or the second subscription.

ABS 321 performs subscription selection based on application preferences. ABS 321 may trigger a permanent or temporary switch recommendation. ABS 321 handles some of the lower layer aspects of DDS selection and plays a role in providing the final recommendation to the SDSM 322. An example is when an application, such as a game or a voice application, may include preferences for subscription capabilities. ABS 321 may access these preferences and then attempt to implement them by triggering a permanent or temporary switch recommendation.

An output recommendation from modem 320 for a temporary DDS and an output recommendation for a permanent DDS are not coupled in some implementations. In other words, those two different kinds of recommendations may happen independently and may even have contradictory values in some instances. In some implementations, at any point in time, there may only be one recommendation for a temporary DDS and one recommendation for a permanent DDS. Furthermore, as shown in FIG. 3 modem 320 sends a recommendation to AP 310, which the AP 310 may display to a user by employing UI 312 on OS 311. Assuming the user accepts, then the AP 310 may send a request back to the modem 320, which directs the modem to perform a switch from one SIM DDS to another SIM being DDS.

Both the OS 311 and the SDSM 322 track DDS state using variables, as shown below:

| | Current DDS | Recommendation from Modem |
| --- | --- | --- |
| Permanent DDS | X or Y | X or Y |
| Temporary DDS | X or Y or null | X or Y or null |
| Actual DDS in use | X or Y | |

Permanent DDS can have one of two values at any given time, in this example, it is X or Y. X or Y may indicate a subscription and may also corresponds one-to-one with a SIM. In other words, each SIM may be associated with a particular subscription. Temporary DDS can have one of three values at any given time, in this example, it is X, Y, or null.

One instance of the state variables is "Current DDS," and it corresponds to a current DDS state in the UE. The current DDS may be decided by a user upon being presented an option on a UI. Each of the two state variables at each of the modem and AP also has a second instance called "Recommendation from Modem," which corresponds to a recommendation sent from the modem to the AP. The "Actual DDS in use" depends on the value of the temporary DDS. If the temporary DDS state variable is active (in other words, is not null), then Actual DDS in use equals the state of the temporary DDS; otherwise, it is equal to the state of the permanent DDS. When Actual DDS in use changes, it may be used to update the "Current DDS" instance of the state variables. The state variables and their values may be stored, written, and read in any appropriate manner at the AP 310 and the modem 320.

Figure 4:
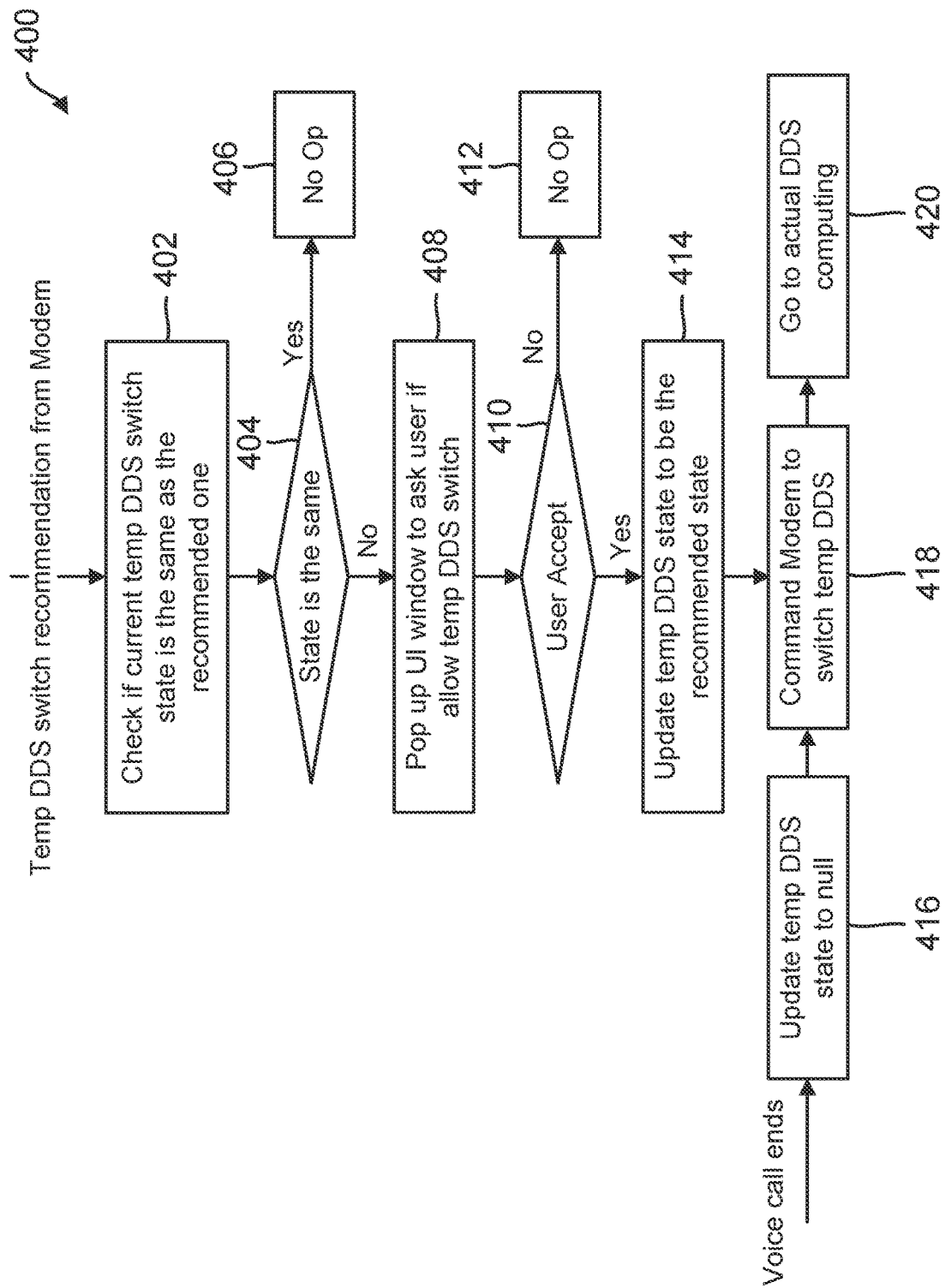
FIGS. 4-8 are flow diagrams for updating and tracking default data service (DDS) state variables, according to some aspects of the disclosure.

FIG. 4 is a flowchart of a method 400 to update a DDS in response to a temporary DDS switch recommendation, according to some aspects of the present disclosure. The method 400 may be performed by an AP, such as AP 310. As illustrated, the method 400 includes a number of enumerated actions, but aspects of the method 400 may include additional actions before, after, and in between the enumerated actions. In some aspects, one or more of the enumerated actions may be omitted or performed in a different order.

At action 402, the AP receives a temporary DDS switch recommendation from the modem and then checks whether the current temporary DDS switch state is the same as the recommended switch state. Thus, the AP may use the states provided above in the table. If the current state and the state in the recommendation from the modem are the same, then there is no operation at action 404. If action 404 determines that the current state and the state in the recommendation from the modem are not the same, then the AP employs the UI to ask the user to allow a temporary DDS switch at action 408.

At action 410, the AP determines whether the user has accepted the option on the UI. If the user does not accept the DDS switch, then there is no operation at action 412. However, if the user does accept the option, then at action 414 the AP updates the temporary DDS state to the state that is recommended by the modem. At action 418, the AP then commands the modem to switch temporary DDS, such as by sending a request to the modem.

There is another way to update the temporary DDS, and that is if an ongoing voice call ends, which is illustrated action 416. When the voice call ends, the AP updates the temporary DDS state to null and commands the modem to switch the temporary DDS at action 418. Once the temporary DDS state goes to null, then the permanent DDS state controls.

Figure 6:
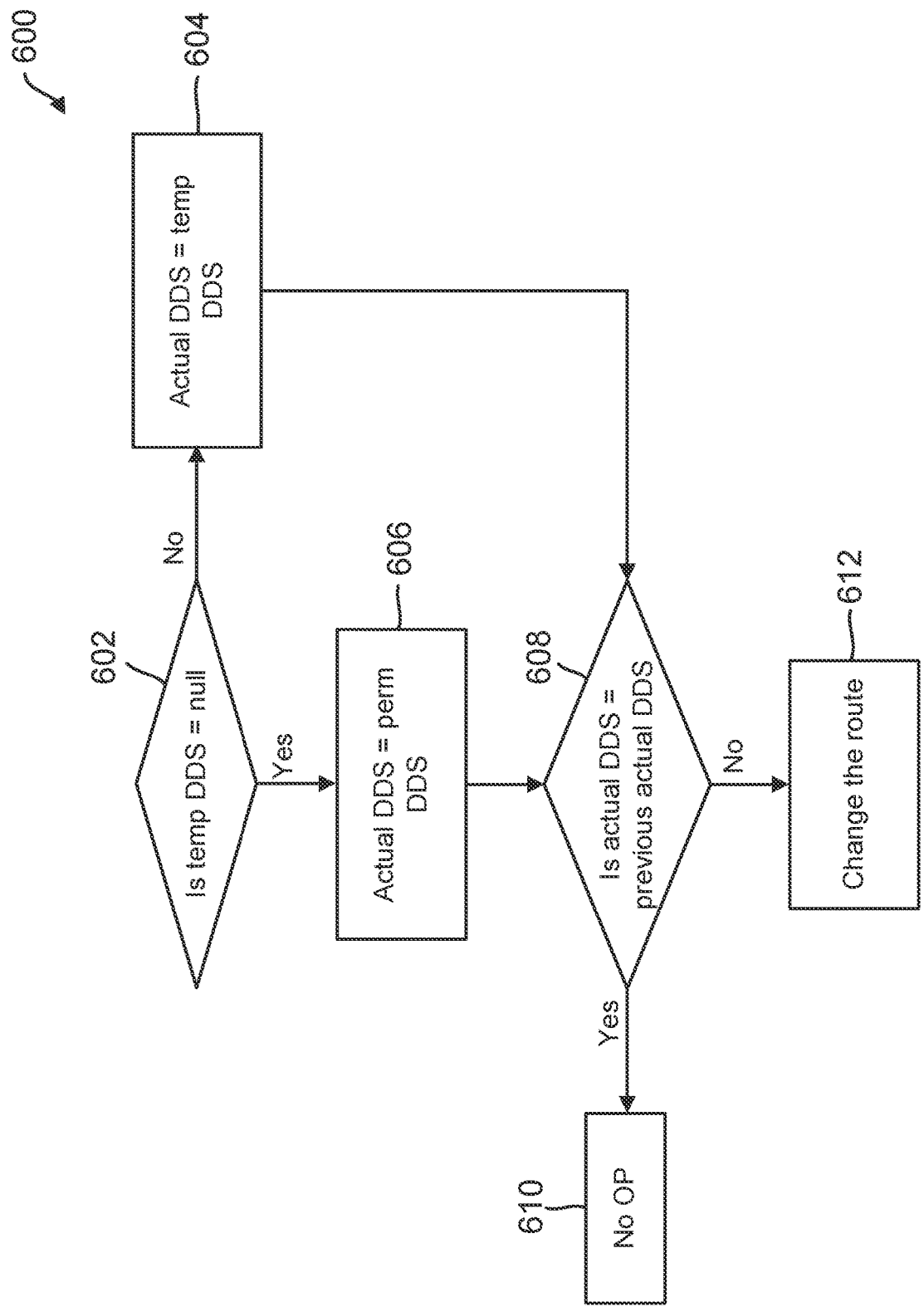

At action 420, the AP performs actual DDS computing, which is described in more detail with respect to FIG. 6.

Figure 5:
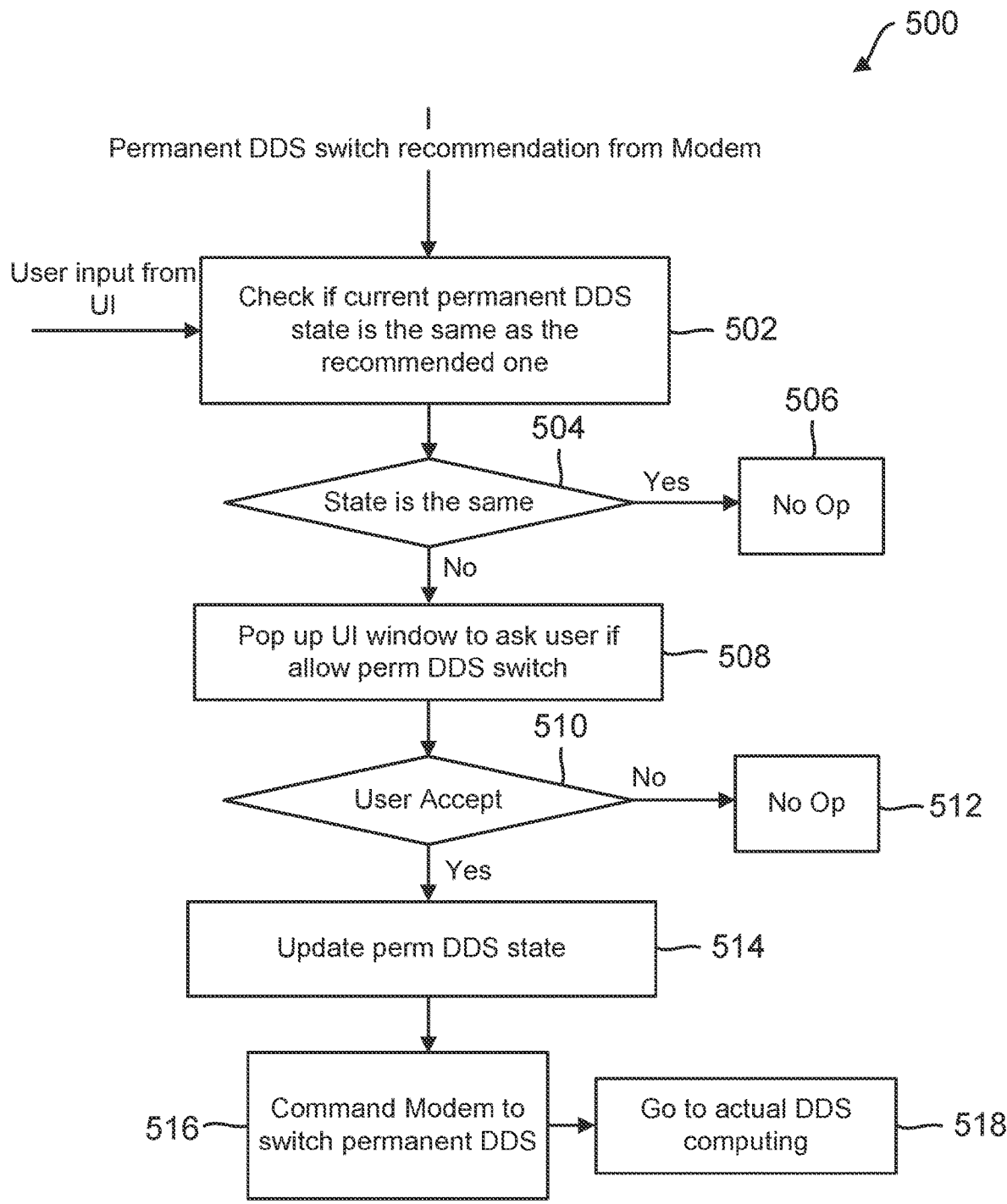

FIG. 5 is a flowchart of a method 500 for computing a permanent DDS in response to receiving a permanent DDS switch recommendation from the modem, according to some aspects of the present disclosure. The method 500 may be performed by an AP, such as AP 310 of FIG. 3. As illustrated, the method 500 includes a number of enumerated actions, but aspects of the method 500 may include additional actions before, after, and in between the enumerated actions. In some aspects, one or more of the enumerated actions may be omitted or performed in a different order.

At action 502, the AP receives a permanent DDS switch recommendation from the modem and checks whether the current permanent DDS state is the same as the DDS state in the permanent DDS switch recommendation. If yes, then there is no operation at action 506. However, if action 504 determines that the state is the same, then the AP asks the user whether to allow a permanent DDS switch at action 508.

If the user accepts the permanent DDS switch at action 510, then the AP updates the permanent DDS state variable to that recommended by the modem at action 514. Otherwise, there is no operation at action 512. At action 516, the AP commands the modem to switch permanent DDS. At action 518, the AP goes to computing the actual DDS, which is explained in more detail with respect to FIG. 6.

FIG. 6 is a flowchart of a method 600 to compute an actual DDS state value, according to some aspects of the present disclosure. The method 600 may be performed by an AP, such as AP 310 of FIG. 3. As illustrated, the method 600 includes a number of enumerated actions, but aspects of the method 600 may include additional actions before, after, and in between the enumerated actions. In some aspects, one or more of the enumerated actions may be omitted or performed in a different order.

At method 600, the AP computes the actual DDS by determining whether the temporary DDS value is the actual DDS value or whether the permanent DDS value is the actual DDS value.

At action 602, the AP determines whether the value of the temporary DDS state variable is null. If not, then the actual DDS equals a temporary DDS value at action 604. Otherwise, the actual DDS value is the permanent DDS value at action 606. At action 608, the AP determines whether the actual DDS value is the same as the previous actual DDS value. If yes, then there is no operation at action 610. However, if the actual DDS value does not equal the previous actual DDS value, then the AP changes the route of data at action 612. In some implementations, the AP uses a stored route to either the first subscription or the second subscription, and in action 612, the AP selects the other stored route so that the data is routed to the other subscription.

Figure 7:
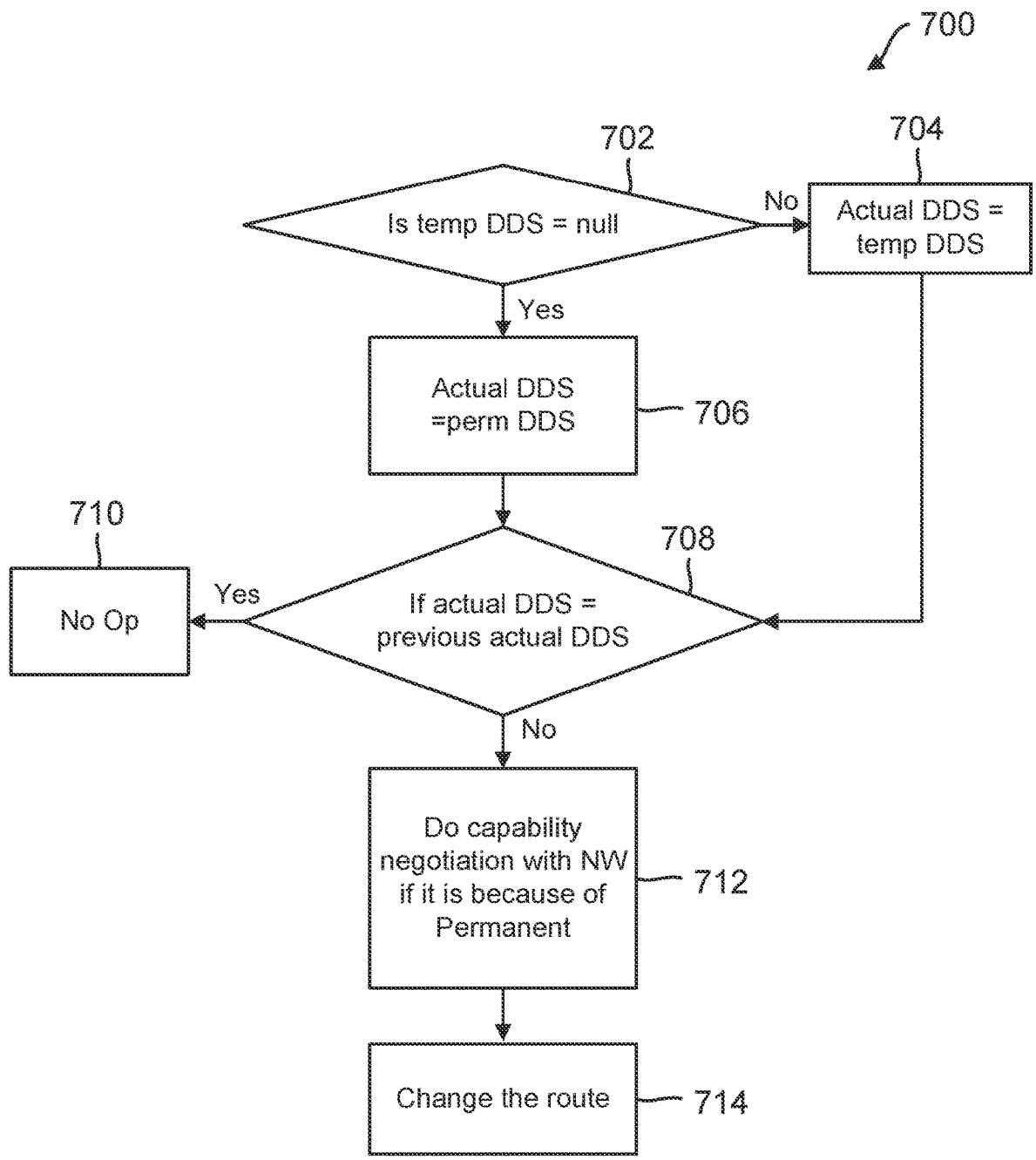

FIG. 7 is a flowchart of a method 700 to compute actual DDS state value, according to some aspects of the present disclosure. The method 700 may be performed by a modem, such as modem 320 of FIG. 3. As illustrated, the method 700 includes a number of enumerated actions, but aspects of the method 700 may include additional actions before, after, and in between the enumerated actions. In some aspects, one or more of the enumerated actions may be omitted or performed in a different order.

In this example, method 700 is similar to method 600 because both the modem and the AP compute actual DDS and store the DDS state values of the Table above. At action 702, the modem determines whether the value of the temporary DDS state variable is null. If not, then the actual DDS equals a temporary DDS value at action 704. Otherwise, the actual DDS value is the permanent DDS value at action 706. At action 708, the modem determines whether the actual DDS value is the same as the previous actual DDS value. If yes, then there is no operation at action 710. However, if the actual DDS value does not equal the previous actual DDS value, the modem may then do capability negotiation with the network if it is because of permanent DDS at action 712. By contrast, if the actual DDS value was equal to the temporary DDS value, then the modem may omit capability negotiation with the network because it would be assumed that the DDS would be changed shortly. Nevertheless, the scope of implementations does not require omitting capability negotiation in the event of a temporary DDS switch.

At action 714 the AP changes the route of data. In some implementations, the modem uses a stored route to either the first subscription or the second subscription, and in action 714, the modem selects the other stored route so that the data is routed to the other subscription.

Figure 8:
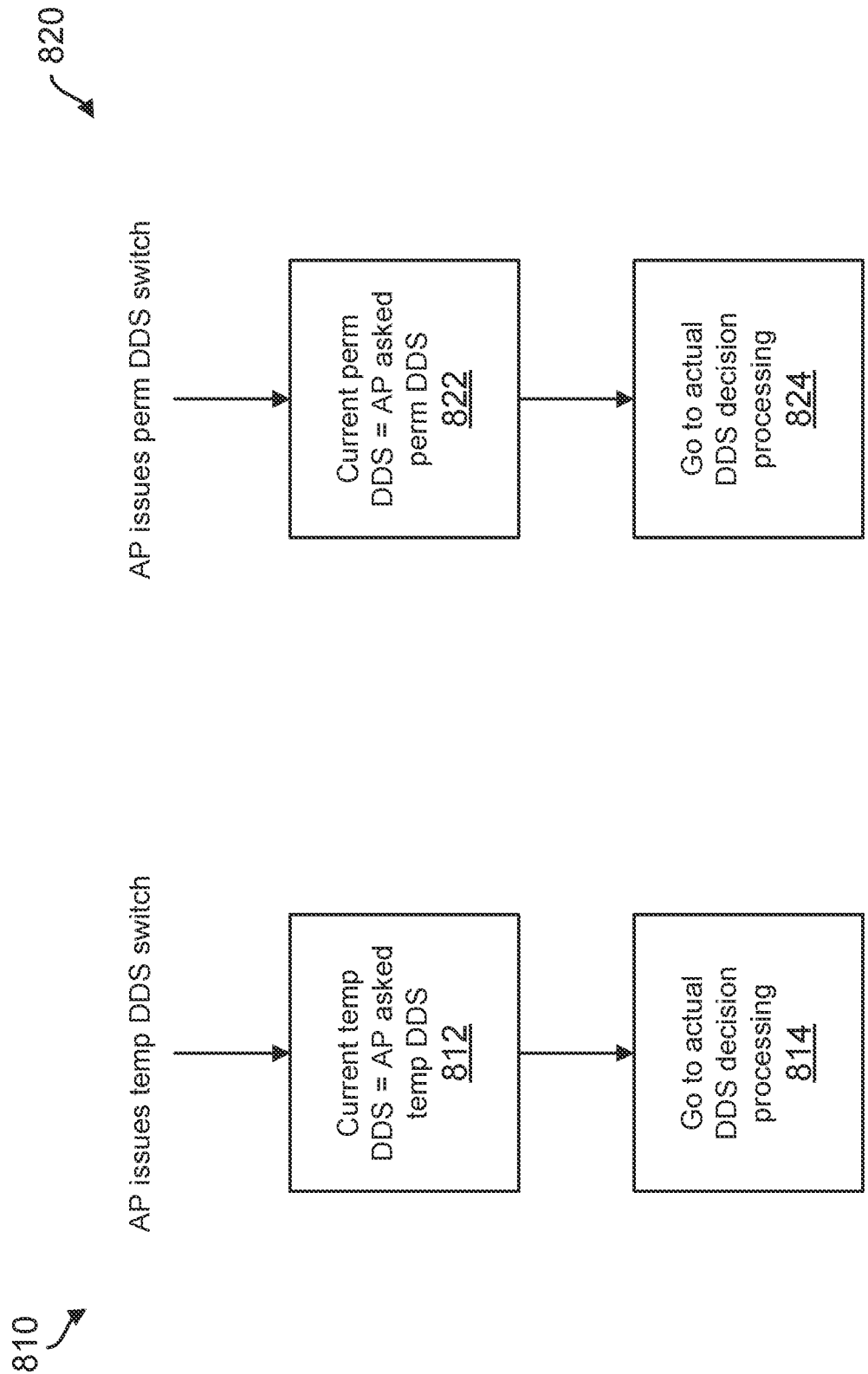

FIG. 8 is an illustration of two different example methods 810, 820 for a modem to react to a switch request from an AP, according to some aspects of the disclosure. Method 810 includes the modem receiving a temporary DDS switch request from the AP, which the modem then complies with. If the current temporary DDS is the same as the DDS that is requested by the AP, the no action is taken at action 812. If the temporary DDS is changed, then the modem goes to the actual DDS decision processing at action 814, which corresponds to method 700 of FIG. 7. Similarly, at method 820, the modem receives a permanent DDS switch request from the AP, which it complies with. If the current permanent DDS is the same as the DDS that is requested by the AP, the no action is taken at action 822. If the permanent DDS is changed, then the modem goes to the actual DDS decision processing at action 814, which corresponds to method 700 of FIG. 7.

The methods of FIGS. 4-8 provide efficient techniques for the AP and the modem to track and change DDS state during operation of a UE. Specifically, both the AP and the modem may store, write, and read values of the state variables as given in the Table above. Advantages of such techniques is that they may provide an accurate way of tracking DDS state in a UE that offers both temporary DDS and permanent DDS. Such techniques may also allow a user to control changes in DDS state as desired to conform to user preferences, such as may be influenced by data caps, cost, network speed, and the like.

Other techniques provide ways to manage multiple recommendations and requests in a UE. Such techniques operate to keep the AP and the modem in synchronization for DDS switches.

Figure 9:
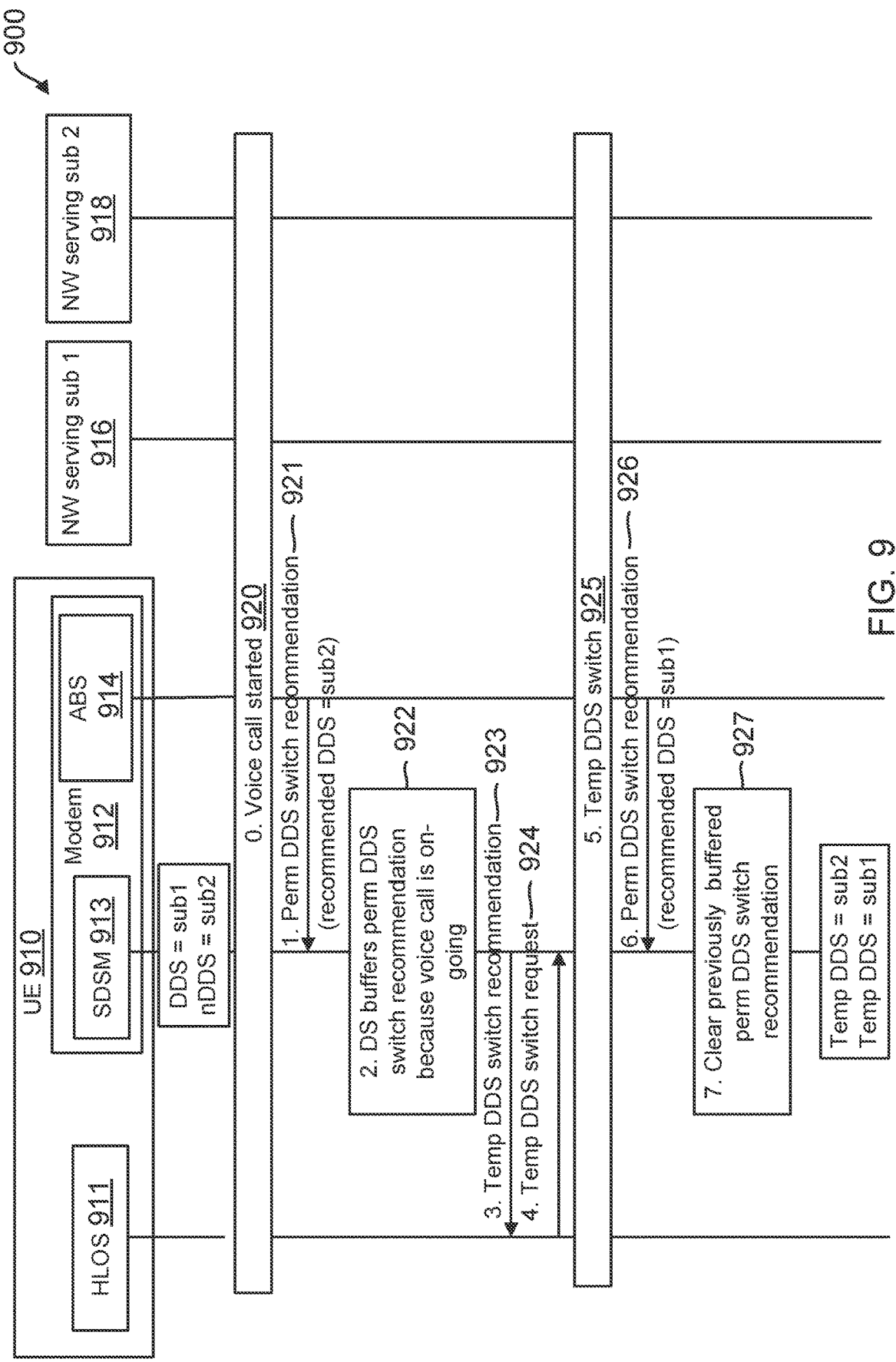
FIGS. 9-11 are diagrams of example methods for managing DDS switch recommendations, according to some aspects of the present disclosure.

FIG. 9 is an illustration of an example method 900 for managing DDS states, according to one implementation of the disclosure. FIG. 9 includes actions that are performed by both the AP and the modem, such as those illustrated in FIG. 3. Specifically, HLOS 911 is a high level operating system, and it corresponds to OS 311 of FIG. 3. HLOS 911 runs on AP 310 (not shown) which is implemented in UE 910. Modem 912 includes ABS 914 and SDSM 913, which correspond to similar components in FIG. 3. Item 916 represents a network that is serving a first subscription (associated with a first SIM), and item 918 represents a network serving a second subscription (associated with a second SIM). The actions of method 900 begin with a permanent DDS being set to subscription 1, and nDDS being set to subscription 2.

According to method 900, when a voice call has been started, including a ringing or alerting state, then the modem 912 does not send a permanent DDS switch recommendation to the AP. In other words, the SDSM 913 will reject a permanent DDS switch request that is triggered by ABS 914. In this manner, the AP will only receive either a permanent DDS switch request or a temporary DDS switch request at any one time, but not both.

At action 920, the voice call is started on subscription 2, and at action 921 the ABS 914 sends a permanent DDS switch recommendation to SDSM 913. The SDSM 913 buffers the permanent DDS switch recommendation because the voice call is ongoing action 922. Instead, the SDSM 913 sends a temporary switch recommendation to the HLOS 911 (at the AP) at action 923, and in response, the HLOS 911 sends back a temporary DDS switch request to the SDSM 913 at action 924. The modem 912 then implements the temporary DDS switch request at action 925. Action 926, ABS 914 determines that a permanent DDS switch is not needed and, in response, it sends a permanent DDS switch recommendation, which recommends that DDS be set to subscription 1. SDSM 913 then clears the buffered permanent DDS switch recommendation.

An advantage of method 900 is that confusion is avoided, as are further DDS changes, by virtue of the modem 912 preventing the AP from receiving a permanent DDS switch request when a temporary DDS switch request is expected to be made due to an ongoing call.

Figure 10:
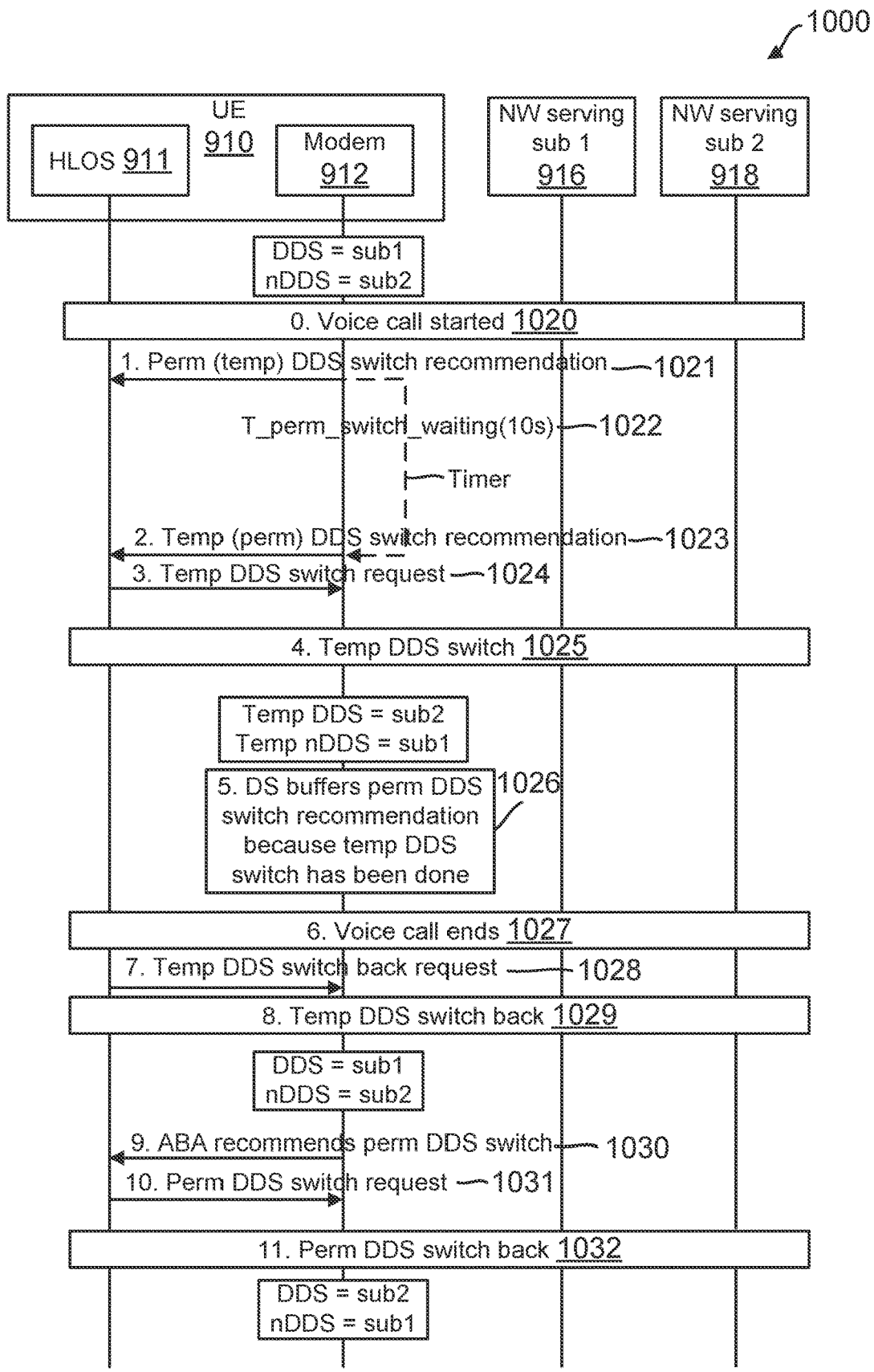

FIG. 10 is an illustration of an example method 1000 for managing DDS states, according to one implementation of the disclosure Similar to method 900, method 1000 also attempts to prevent the AP from receiving a permanent DDS switch request when a temporary DDS switch request is expected. To that end, the modem uses a timer to avoid back-to-back DDS switch recommendations. Thus, during a temporary DDS switch, the modem delays the permanent DDS switch recommendation until the temporary DDS switch ends.

At action 1020, a voice call is started on subscription 2. Once a permanent (or temporary) DDS switch recommendation is sent to HLOS 911 at action 1021, the modem does not send subsequent temporary (or permanent) DDS switch recommendation to HLOS 911 (action 1023) for at least T_dds_switch_waiting seconds (action 1022), to give some time for HLOS 911 to decide whether to follow modem recommendation.

Once temporary DDS switch is completed at action 1025, modem 912 buffers subsequent permanent DDS switch recommendation (action 1026) until temporary DDS switch ends. The temporary DDS switch ends at action 1029 after the voice call ends at action 1027 and the temporary DDS switch back request is received at action 1028. Thus, after action 1029, DDS is set back to subscription 1.

At action 1030, the modem 912 sends the buffered permanent DDS switch request to the HLOS 911, which replies by sending a permanent DDS switch request at 1031. The permanent DDS switch back is performed at action 1032 so that the DDS is set to subscription 2. Method 1000 prevents a scenario in which multiple recommendations are active at the AP at any given time, thereby reducing or eliminating confusion and unwanted DDS switches.

Figure 11:
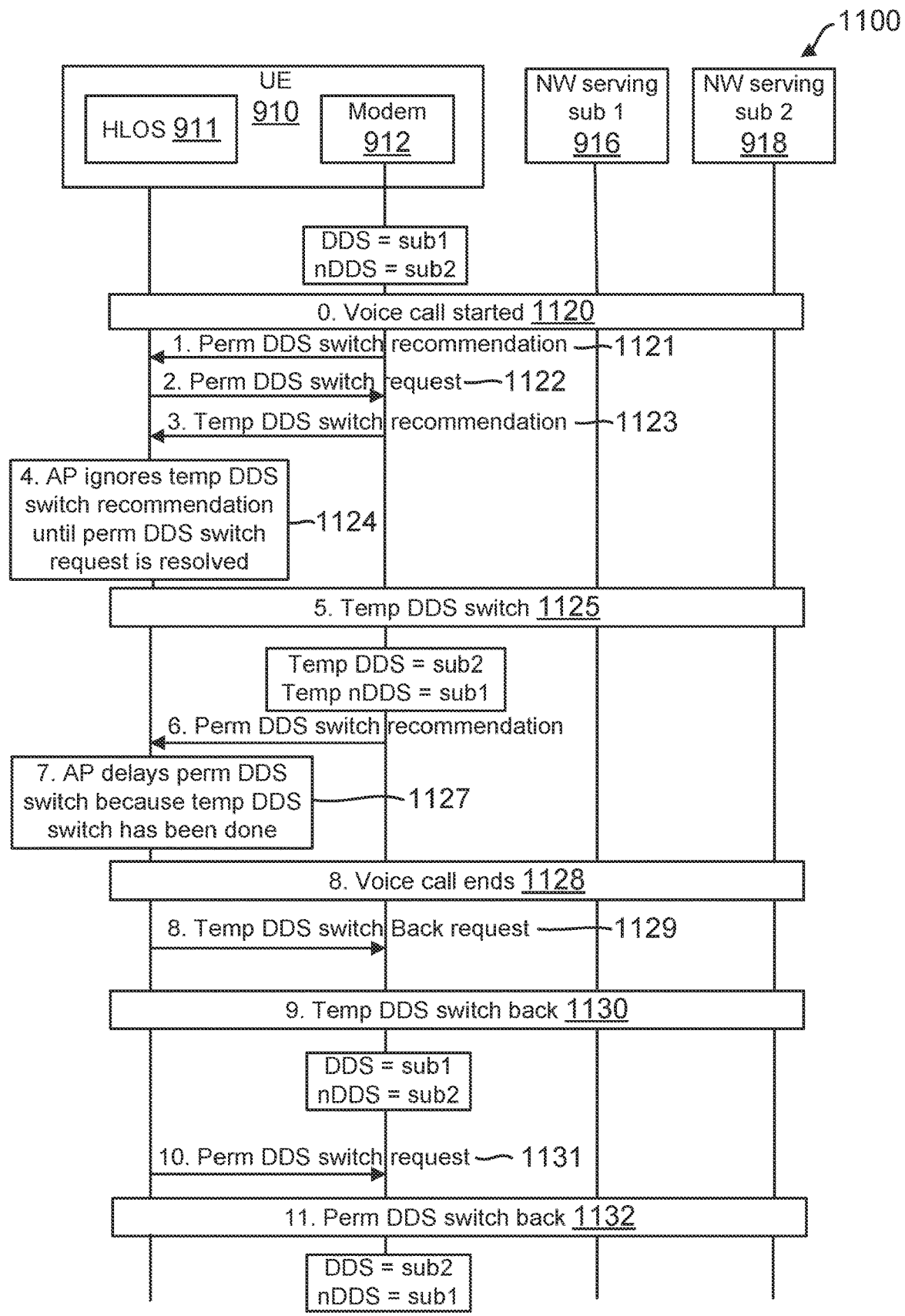

FIG. 11 is an illustration of an example method 1100 for managing DDS states, according to one implementation of the disclosure. Method 1100 provides a way to consolidate recommendations, similar to methods 900, 1000, except that in method 1100 it is the HLOS 911 which delays sending a request to avoid multiple actionable requests at any given time. In method 1100, the HLOS 911 ignores a temporary DDS switch recommendation if a permanent DDS switch request is pending. During a temporary DDS switch, even if the modem 912 recommends a permanent DDS switch, HLOS 911 does not trigger a permanent DDS switch request until the temporary DDS switch ends. The example of FIG. 11 assumes that the modem 912 may now send switch recommendations freely, so it is the responsibility of the HLOS 911 to handle back-to-back recommendations in an acceptable manner.

At action 1120, the voice call is started on subscription 2. At actions 1121-1123, HLOS 911 triggers a permanent DDS switch request, and the modem 912 sends a temporary DDS switch recommendation to HLOS 911. HLOS 911 ignores the temporary DDS switch recommendation until the permanent DDS switch request is resolved at action 1124.

In any event, a temporary DDS switch is performed at action 1125 because the voice call is ongoing, thereby setting the temporary DDS to subscription 2. The modem 912 once again sends a permanent DDS switch recommendation at action 1126, and at action 1127, the HLOS 911 delays the permanent DDS switch at least until the temporary DDS is switched back at action 1130. The call flow continues with the voice call ending at action 1128, and the HLOS 911 triggering the temporary DDS switch back request at 1129. Only after the temporary DDS has been switched back does the HLOS 911 trigger the permanent DDS switch request at action 1131, which is carried out at action 1132.

While methods 900-1100 illustrate techniques to handle recommendations from the modem, methods 1200-1400 illustrate techniques to handle requests from the HLOS 911

(at the AP). It should be noted that methods 900-1100 are not mutually exclusive of methods 1200-1400, as the techniques for delaying or ignoring recommendations in methods 900-1100 may be combined with the actions of methods 1200-1400.

Figure 12:
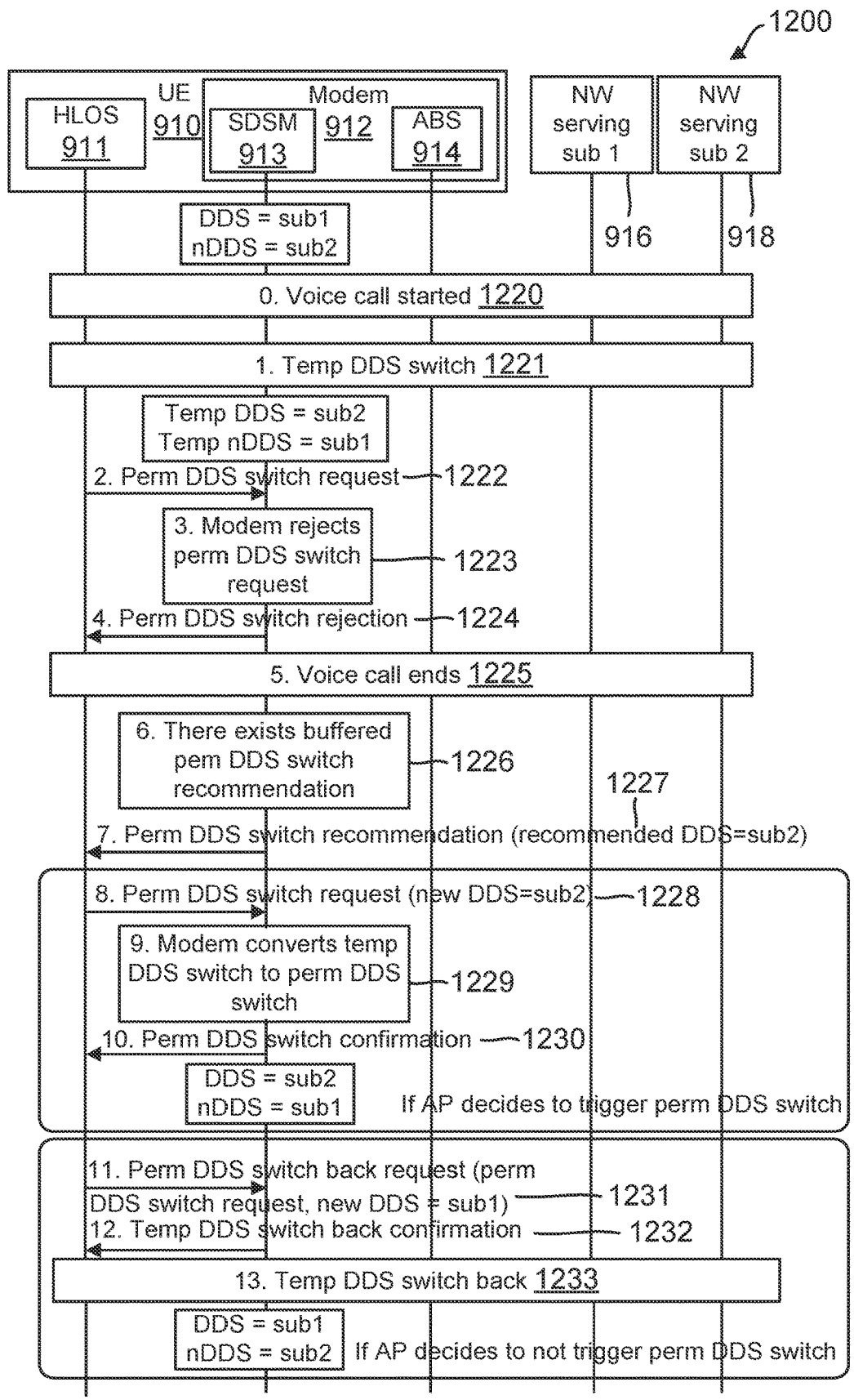
FIGS. 12-14 are diagrams of example methods for managing DDS switch requests, according to some aspects of the present disclosure.

FIG. 12 is an illustration of example method 1200, for managing DDS states, according to one implementation of the disclosure. At action 1220, a voice call is started on subscription 2 with the permanent DDS being set at subscription 1. A temporary switch is then affected at action 1221 due to the ongoing voice call, and that changes the DDS temporarily to subscription 2. In this example, logic at the AP, such as in HLOS 911, has its own functionality to determine that a permanent DDS switch is desired and to send a permanent DDS switch request at action 1222.

Further in this example, the modem 912 rejects the permanent DDS switch request at actions 1223-1224. The voice call then ends at action 1225.

Continuing with the example, there exists a buffered permanent DDS switch recommendation at action 1226. The permanent DDS switch recommendation may be buffered from prior actions (e.g., action 922 in FIG. 9) in which logic at the modem 912 determined that a permanent DDS switch should be made. Once a voice call ends, the modem 912 checks if there are any buffered DDS switch recommendations. If so, then the modem 912 sends a permanent DDS switch recommendation to the HLOS at action 1227. This state sets up two different scenarios addressed at actions 1228-1230 and 1231-1233, respectively.

At action 1228, the HLOS 911 determines to move forward with a permanent DDS switch, so it sends a permanent DDS switch request at action 1228. In response, the modem 912 converts the temporary DDS switch to a permanent DDS switch at action 1229 and sends a confirmation at action 1230. As a result, the permanent DDS is set to subscription 2.

Alternatively, at action 1231, the HLOS 911 has determined not to trigger the permanent DDS switch because it would prefer that the temporary DDS switch is reversed, thereby leaving the permanent DDS to be subscription 1. At action 1231, the HLOS 911 sends a temporary switch back request, and the modem 912 sends a confirmation at 1232 and affects the switch back at action 1233. As a result, the permanent DDS remains at subscription 1.

An advantage of method 1200 is that it avoids DDS switching back-and-forth. DDS switching back-and-forth may result in interrupted Internet connections and may be annoying to a user. Thus, method 1200 (as well as methods 900-1100 and 1300-1400) may increase satisfaction of the user as well as efficiency of the UE.

Figure 13:
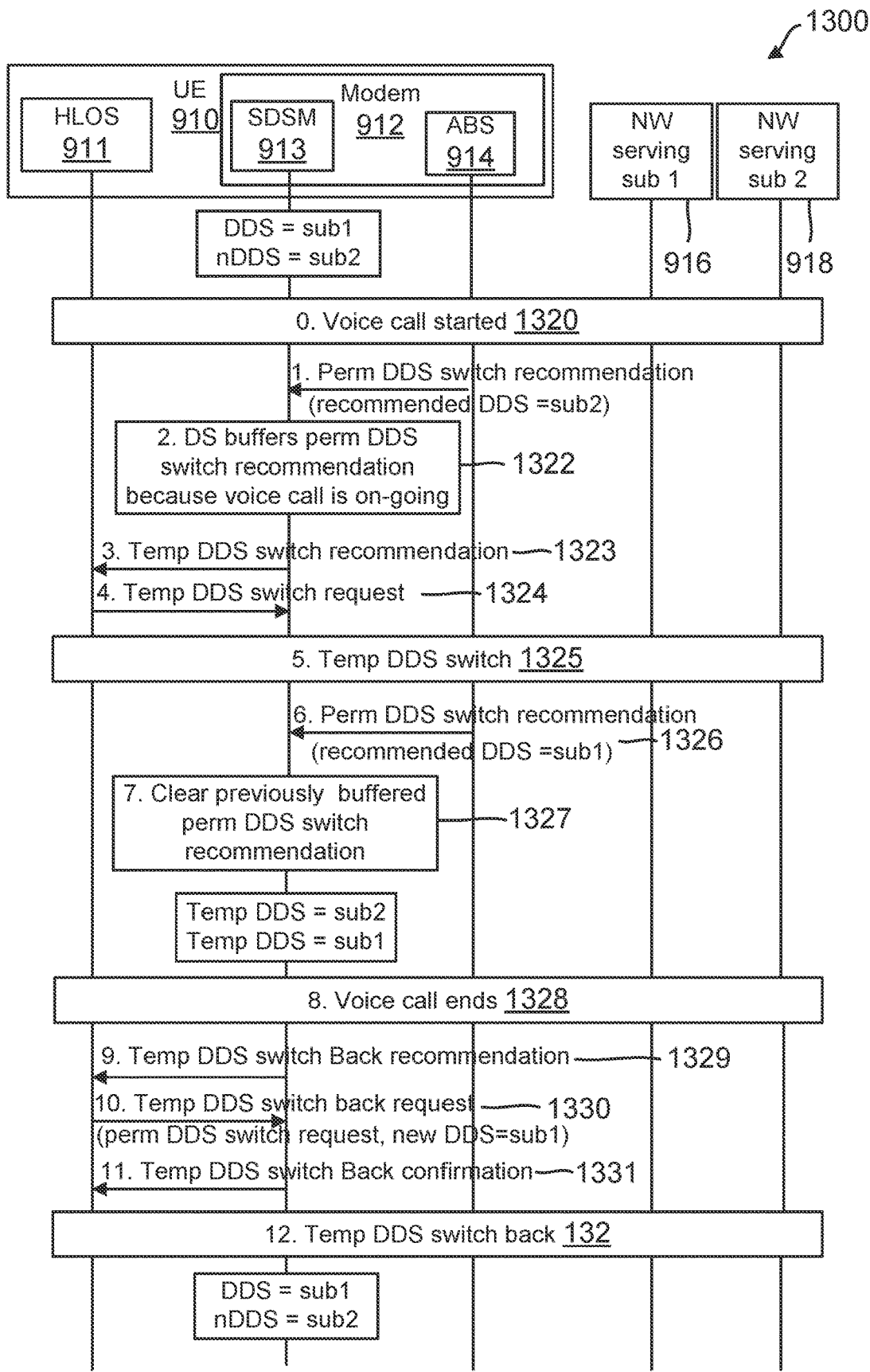

FIG. 13 is an illustration of example method 1300 for managing DDS states, according to one implementation of the disclosure. Method 1300 is provided to illustrate a scenario in which there is no buffered permanent recommendation at the modem 912 when the voice call ends.

Action 1320, a voice call is started on subscription 2, and the ABS 914 sends a permanent switch recommendation at action 1321 to SDSM 913, which then buffers the permanent switch recommendation because the voice call is ongoing at action 1322. Instead, SDSM 913 sends a temporary switch recommendation at action 1323, and HLOS 911 sends a temporary switch request back at action 1324, thereby causing the temporary DDS switch to be carried out at 1325. The temporary DDS is now set to subscription 2.

At action 1326, ABS 914 sends another permanent switch recommendation, this time recommending that the permanent DDS be set at subscription 1, and that contradicts the previous recommendation at action 1321. Accordingly, the SDSM 913 clears the previously buffered permanent DDS switch recommendation at action 1327.

Now the voice call ends at action 1328, and there is no buffered permanent DDS switch recommendation. The system then relies on the modem 912 sending a recommendation for a temporary DDS switch back at action 1329. The HLOS 911 responds by sending a temporary DDS switch back request at action 1330, to which the modem 912 confirms at 1331. The temporary DDS is then switched back at action 1332, and the permanent DDS remains set to subscription 1.

Figure 14:
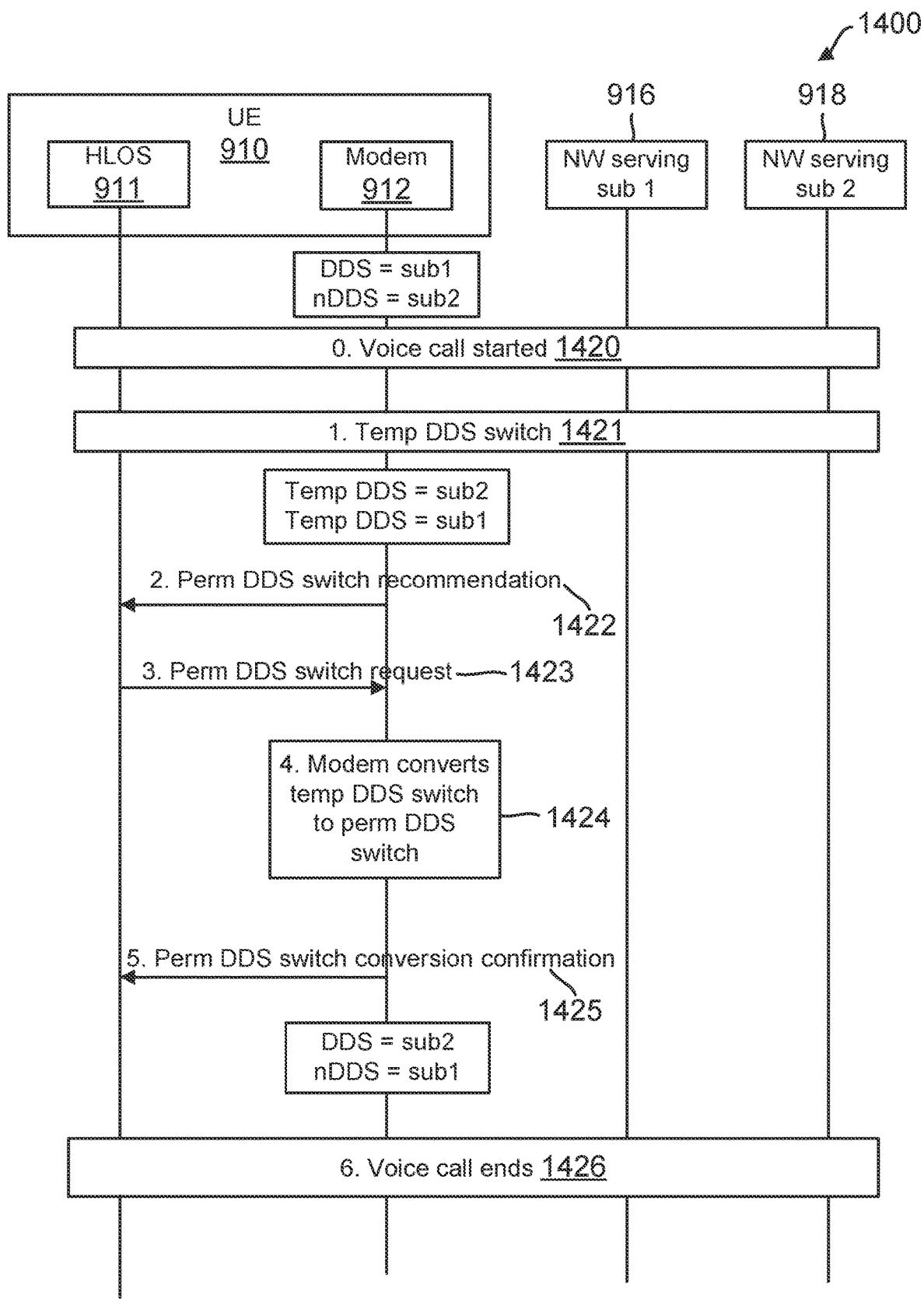

FIG. 14 is an illustration of example method 1400 for managing DDS states, according to one implementation of the disclosure. In method 1400, during a temporary DDS switch, when HLOS 911 requests to perform a permanent DDS switch, the modem converts the temporary DDS switch to a permanent DDS switch. The permanent DDS switch request from HLOS 911 may or may not be caused by a modem recommendation.

At action 1420 the voice call is started on subscription 2. A temporary DDS switch is carried out at action 1421, so that the temporary DDS is set to subscription 2. The modem 912 then sends a permanent DDS switch recommendation to HLOS 911 at action 1422. HLOS 911 responds at action 1423 by sending a permanent DDS switch request at 1423. The modem 912 then converts the temporary DDS switch request to a permanent DDS switch request at action 1424 and confirms the switch at action 1425. As a result, permanent DDS is set to subscription 2. The voice call ends at action 1426.

The scope of implementations is not limited to actions specifically shown in methods 900-1400. For instance, the methods 400-800 of FIGS. 4-8 may be used with the methods 900-1400. For instance, a modem and AP may use the methods 400-800 to track state values for temporary DDS, permanent DDS, and actual DDS, as the states are changed during the methods 900-1400. Additionally, user input at a UI may or may not be solicited and used during a temporary or permanent DDS switch in the actions of methods 900-1400.

Figure 15:
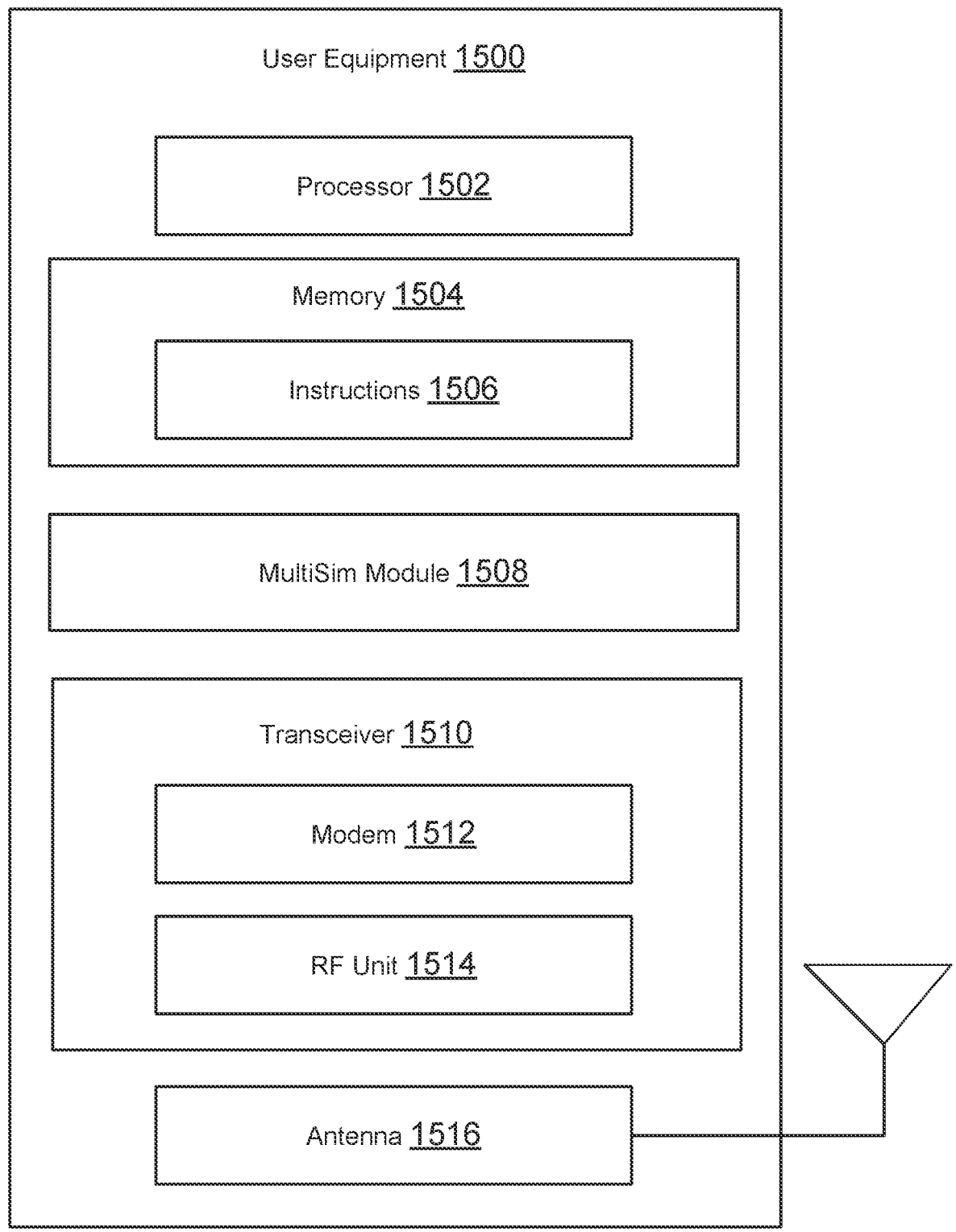
FIG. 15 illustrates a block diagram of a user equipment (UE) according to some aspects of the present disclosure.

FIG. 15 is a block diagram of an exemplary UE 1500 according to some aspects of the present disclosure. The UE 1500 may be a UE 115 or UE 215 as discussed above in FIGS. 1-2. As shown, the UE 1500 may include a processor 1502, a memory 1504, a MultiSim module 1508, a DRX selection module 1109, a transceiver 1510 including a modem subsystem 1512 and a radio frequency (RF) unit 1514, and one or more antennas 1516. These elements may be coupled with one another. The term "coupled" may refer to directly or indirectly coupled or connected to one or more intervening elements. For instance, these elements may be in direct or indirect communication with each other, for example via one or more buses.

The processor 1502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1502 may also be implemented as a combination of computing devices, e.g., a combination of a DSP and a microprocessor, a plurality of microprocessors, one or more microprocessors in conjunction with a DSP core, or any other such configuration. The processor 1502 may correspond to the application processor (AP) discussed above, upon which OS 311 (and HLOS 911) runs.

The memory 1504 may include a cache memory (e.g., a cache memory of the processor 1502), random access memory (RAM), magnetoresistive RAM (MRAM), read-only memory (ROM), programmable read-only memory (PROM), erasable programmable read-only memory (EPROM), electrically erasable programmable read only memory (EEPROM), flash memory, solid state memory device, hard disk drives, other forms of volatile and non-volatile memory, or a combination of different types of memory. In an aspect, the memory 1504 includes a non-transitory computer-readable medium. The memory 1504 may store, or have recorded thereon, instructions 1506. The instructions 1506 may include instructions that, when executed by the processor 1502, cause the processor 1502 to perform the operations described herein with reference to a UE 115, 215 in connection with aspects of the present disclosure, for example, aspects of FIGS. 1-14. Instructions 1506 may also be referred to as code, which may include any type of computer-readable statements.

The MultiSim module 1508 may be implemented via hardware, software, or combinations thereof. For example, the MultiSim module 1508 may be implemented as a processor, circuit, and/or instructions 1506 stored in the memory 1504 and executed by the processor 1502.

In some aspects, the MultiSim module 1508 may include multiple SIMs or SIM cards (e.g., 2, 3, 4, or more) similar to the SIMs 210. Each SIM may be configured to store information used for accessing a network, for example, to authenticate and identify the UE 1500 as a subscriber of the network. Some examples of information stored on a SIM may include, but not limited to, a subscriber identity such as an international mobile subscriber identity (IMSI) and/or information and/or key used to identify and authenticate the UE 1500 in a certain provider network. In some aspects, the UE 1500 may have a first subscription on a first SIM of the multiple SIMs and a second subscription on a second SIM of the multiple SIMs. The first subscription may identify the UE 1500 by a first subscriber identity, and the second subscription may identify the UE 1500 by a second subscriber identity.

As shown, the transceiver 1510 may include the modem subsystem 1512 and the RF unit 1514. The transceiver 1510 can be configured to communicate bi-directionally with other devices, such as the BSs 105 and 500. The modem 1512 may be configured to include the logic portions discussed at FIG. 3 and to perform the actions discussed above with respect to FIGS. 3-14.

The modem subsystem 1512 may be configured to modulate and/or encode the data from the memory 1504 and the MultiSim module 1508 according to a modulation and coding scheme (MCS), e.g., a low-density parity check (LDPC) coding scheme, a turbo coding scheme, a convolutional coding scheme, a digital beamforming scheme, etc. The RF unit 1514 may be configured to process (e.g., perform analog to digital conversion or digital to analog conversion, etc.) modulated/encoded data (e.g., PUSCH data, PUCCH UCI, MSG1, MSG3, etc.) or of transmissions originating from another source such as a UE 115, a BS 105, or an anchor. The RF unit 1514 may be further configured to perform analog beamforming in conjunction with the digital beamforming. Although shown as integrated together in transceiver 1510, the modem subsystem 1512 and the RF unit 1514 may be separate devices that are coupled together at the UE 1500 to enable the UE 1500 to communicate with other devices.

The RF unit 1514 may provide the modulated and/or processed data, e.g. data packets (or, more generally, data messages that may contain one or more data packets and other information), to the antennas 1516 for transmission to one or more other devices. The antennas 1516 may further receive data messages transmitted from other devices. The antennas 1516 may provide the received data messages for processing and/or demodulation at the transceiver 1510. The transceiver 1510 may provide the demodulated and decoded data (e.g., RRC configurations, MIB, PDSCH data and/or PDCCH DCIs, etc.) to the MultiSim module 1508 for processing. The antennas 1516 may include multiple antennas of similar or different designs in order to sustain multiple transmission links.

In an aspect, the UE 1500 can include multiple transceivers 1510 implementing different RATs (e.g., NR and LTE). In an aspect, the UE 1500 can include a single transceiver 1510 implementing multiple RATs (e.g., NR and LTE). In an aspect, the transceiver 1510 can include various components, where different combinations of components can implement different RATs.

Figure 16:
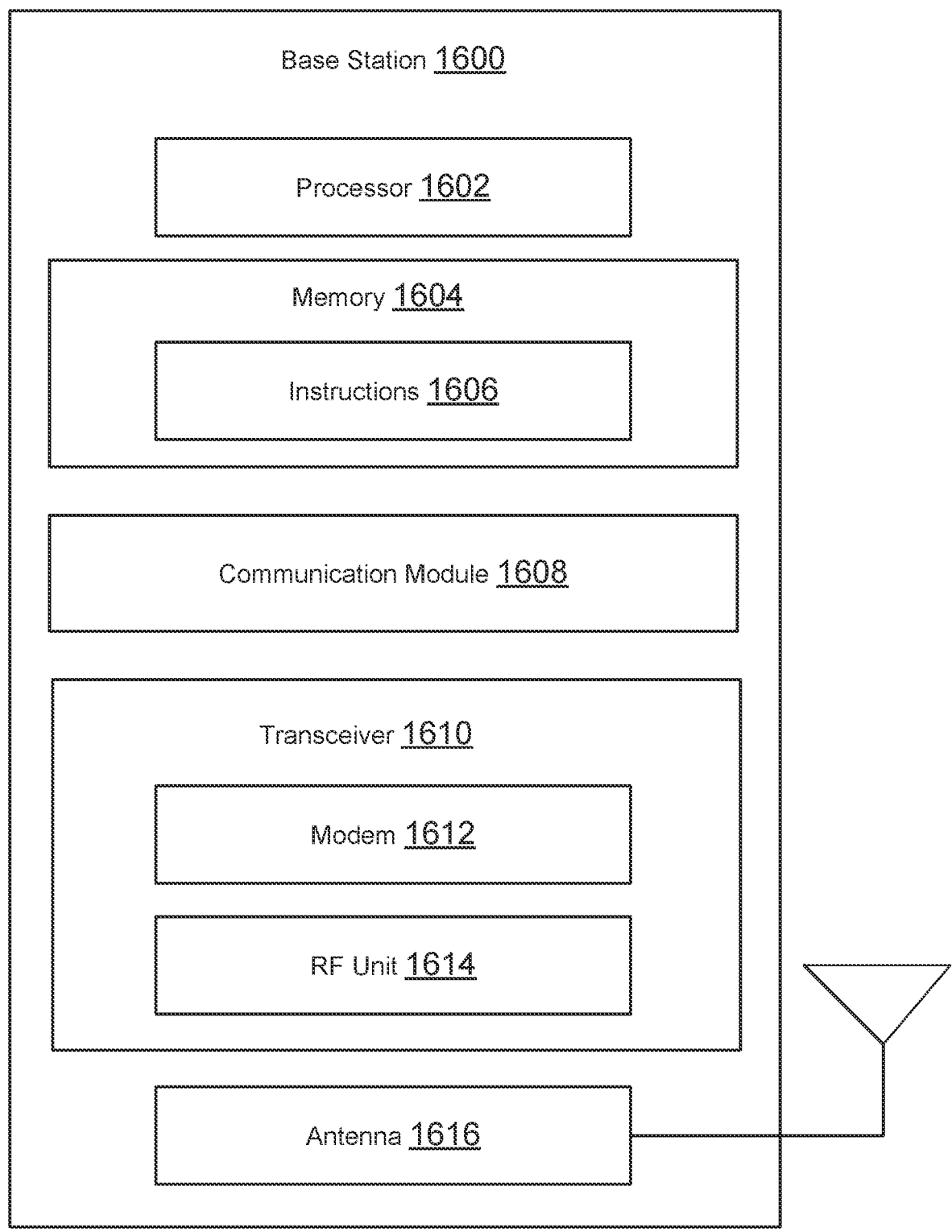
FIG. 16 illustrates a block diagram of a base station (BS) according to some aspects of the present disclosure.

FIG. 16 is a block diagram of an exemplary BS 1600 according to some aspects of the present disclosure. The BS 1600 may be a BS 105 or a BS 205 as discussed in FIGS. 1 and 2. As shown, the BS 1600 may include a processor 1602, a memory 1604, a communication module 1608, a transceiver 1610 including a modem subsystem 1612 and a RF unit 1614, and one or more antennas 1616. These elements may be coupled with one another. The term "coupled" may refer to directly or indirectly coupled or connected to one or more intervening elements. For instance, these elements may be in direct or indirect communication with each other, for example via one or more buses.

The processor 1602 may have various features as a specific-type processor. For example, these may include a CPU, a DSP, an ASIC, a controller, a FPGA device, another hardware device, a firmware device, or any combination thereof configured to perform the operations described herein. The processor 1602 may also be implemented as a combination of computing devices, e.g., a combination of a DSP and a microprocessor, a plurality of microprocessors, one or more microprocessors in conjunction with a DSP core, or any other such configuration.

The memory 1604 may include a cache memory (e.g., a cache memory of the processor 1602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1604 may include a non-transitory computer-readable medium. The memory 1604 may store instructions 1606. The instructions 1606 may include instructions that, when executed by the processor 1602, cause the processor 1602 to perform operations described herein, for example, aspects of FIGS. 1 and 2. Instructions 1606 may also be referred to as program code. The program code may be for causing a wireless communication device to perform these operations, for example by causing one or more processors (such as processor 1602) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 1608 may be implemented via hardware, software, or combinations thereof. For example, the communication module 1608 may be implemented as a processor, circuit, and/or instructions 1606 stored in the memory 1604 and executed by the processor 1602. In some examples, the communication module 1608 can be integrated within the modem subsystem 1612. For example, the communication module 1608 can be implemented by a combination of software components (e.g., executed by a DSP or a general processor) and hardware components (e.g., logic gates and circuitry) within the modem subsystem 1612. The communication module 1608 may communicate with one or more components of BS 1600 to implement various aspects of the present disclosure, for example, aspects of FIGS. 1 and 2.

As shown, the transceiver 1610 may include the modem subsystem 1612 and the RF unit 1614. The transceiver 1610 can be configured to communicate bi-directionally with other devices, such as the UEs 115, 215 and/or BS 1600 and/or another core network element. The modem subsystem 1612 may be configured to modulate and/or encode data according to a MCS, e.g., a LDPC coding scheme, a turbo coding scheme, a convolutional coding scheme, a digital beamforming scheme, etc. The RF unit 1614 may be configured to process (e.g., perform analog to digital conversion or digital to analog conversion, etc.) modulated/encoded data (e.g., RRC configurations, MIB, PDSCH data and/or PDCCH DCIs, etc.) from the modem subsystem 1612 (on outbound transmissions) or of transmissions originating from another source such as a UE 115, 215, and/or UE 1600. The RF unit 1614 may be further configured to perform analog beamforming in conjunction with the digital beamforming. Although shown as integrated together in transceiver 1610, the modem subsystem 1612 and/or the RF unit 1614 may be separate devices that are coupled together at the BS 1600 to enable the BS 1600 to communicate with other devices.

The RF unit 1614 may provide the modulated and/or processed data, e.g. data packets (or, more generally, data messages that may contain one or more data packets and other information), to the antennas 1616 for transmission to one or more other devices. The antennas 1616 may further receive data messages transmitted from other devices and provide the received data messages for processing and/or demodulation at the transceiver 1610. The transceiver 1610 may provide the demodulated and decoded data (e.g., PUSCH data, PUCCH UCI, MSG1, MSG3, etc.) to the communication module 1608 for processing. The antennas 1616 may include multiple antennas of similar or different designs in order to sustain multiple transmission links.

In an aspect, the BS 1600 can include multiple transceivers 1610 implementing different RATs (e.g., NR and LTE). In an aspect, the BS 1600 can include a single transceiver 1610 implementing multiple RATs (e.g., NR and LTE). In an aspect, the transceiver 1610 can include various components, where different combinations of components can implement different RATs.

Further aspects of the present disclosure include the following clauses:

1. A method of wireless communication performed by a user equipment (UE), the method comprising:
   operating in a Dual SIM Dual Active (DSDA) mode or a Dual SIM Dual Standby (DSDS) mode in which a first subscriber identity module (SIM) is designated as a default data subscription (DDS);
   determining a recommendation to change the DDS from the first SIM to a second SIM at a modem;
   informing a user of the recommendation to change the DDS;
   changing the DDS in response to, at least in part, the recommendation an input from the user;
   updating a first state variable to indicate a state of the DDS; and
   routing internet data to the second SIM.
2. The method of clause 1, wherein changing the DDS comprises designating the second SIM as a temporary DDS, and wherein updating the first state variable includes updating a temporary DDS state variable to refer to the second SIM.
3. The method of clause 2, further comprising:
   changing the DDS back to the first SIM, including updating the temporary DDS state variable to be null.
4. The method of clause 2, further comprising:
   omitting to correspond with a base station to indicate capabilities of the second SIM.
5. The method of clause 1, wherein changing the DDS comprises designating the second SIM as a permanent DDS, and wherein updating the first state variable includes updating a permanent DDS state variable to refer to the second SIM, the method further including:
   updating a second state variable, including updating a temporary DDS state variable to be null.
6. The method of clause 5, further comprising:
   corresponding with a base station to indicate capabilities of the second SIM.
7. The method of clauses 1-5, wherein the first state variable is part of a set of state variables including:
   a permanent DDS state variable having two possible states, one for the first SIM and one for the second SIM; and
   a temporary DDS state variable having three possible states, one for the first SIM, one for the second SIM, and a null value,
   wherein the temporary DDS state variable overrides the permanent DDS state variable unless the temporary DDS state variable has the null value.
8. The method of clause 7, wherein the first state variable is the temporary DDS state variable, the method further comprising:
   determining an actual DDS in use, including confirming that the temporary DDS state variable refers to the second SIM.
9. The method of clause 7, wherein the first state variable is the permanent DDS state variable, the method further comprising:
   determining an actual DDS in use, including confirming that the temporary DDS state variable has the null value.
10. A non-transitory computer-readable medium having program code recorded thereon for wireless communication by a user equipment (UE), the program code comprising:
    code for operating in a Dual SIM Dual Active (DSDA) mode or a Dual SIM Dual Standby (DSDS) mode in which a first subscriber identity module (SIM) is designated as a default data subscription (DDS); and
    code for consolidating a plurality of switch recommendations from a modem of the UE to a processor of the UE.
11. The non-transitory computer-readable medium of clause 10, wherein the code for consolidating the plurality of switch recommendations comprises:
    code for causing the modem to buffer a permanent DDS switch recommendation while a voice call is ongoing.

12. The non-transitory computer-readable medium of clause 11, further comprising:
code for either clearing the permanent DDS switch recommendation or sending the permanent DDS switch recommendation to the processor subsequent to the voice call ending.
13. The non-transitory computer-readable medium of clauses 10-12, wherein the code for consolidating the plurality of switch recommendations comprises:
code for employing a hysteresis timer between a temporary DDS switch recommendation from the modem and a permanent DDS switch recommendation from the modem.
14. The non-transitory computer-readable medium of clauses 10-13, wherein the code for consolidating the plurality of switch recommendations comprises:
code for waiting until a temporary DDS switch ends before sending a permanent DDS switch recommendation to the processor.
15. The non-transitory computer-readable medium of clauses 10-14, wherein the code for consolidating the plurality of switch recommendations comprises:
code for causing the processor to trigger a DDS switch request; and
code for causing the processor to ignore a subsequent switch recommendation until the DDS switch request is resolved.
16. The non-transitory computer-readable medium of clauses 10-15, wherein the code for consolidating the plurality of switch recommendations comprises:
delaying a permanent DDS switch request during a duration of a temporary DDS switch.
17. A user equipment (UE) comprising:
a first subscriber identity module (SIM) and a second SIM;
means for operating in a Dual SIM Dual Active (DSDA) mode or a Dual SIM Dual Standby (DSDS) mode in which the first SIM is designated as a default data subscription (DDS); and
means for performing a temporary DDS switch;
means for sending a permanent DDS switch recommendation during a duration of the temporary DDS switch;
means for receiving a permanent DDS switch request from a processor of the UE; and
means for converting the temporary DDS switch into a permanent DDS switch in response to the permanent DDS switch request.
18. The UE of clause 17, further comprising:
means for sending a permanent DDS switch confirmation to the processor.
19. A user equipment (UE) comprising:
a first subscriber identity module (SIM) associated with a first service provider subscription and a second SIM associated with a second service provider subscription;
a modem configured to interface with a base station; and
a processor configured to interface with the modem and to access the first SIM and the second SIM, wherein the modem is further configured to:
operate in a Dual SIM Dual Active (DSDA) mode or a Dual SIM Dual Standby (DSDS) mode in which the first SIM is designated as a default data subscription (DDS); and
perform a temporary DDS switch;
receive a permanent DDS switch request from the processor; and
reject the permanent DDS switch request.

20. The UE of clause 19, wherein the modem is further configured to:
confirm presence of a buffered DDS switch recommendation at the modem;
convert the temporary DDS switch to a permanent DDS switch in response to the permanent DDS switch request from the processor; and
send a permanent DDS switch confirmation to the processor.
21. The UE of clauses 19-20, wherein the modem is further configured to:
switch back the temporary DDS switch.
22. The UE of clauses 19-21, wherein the processor is further configured to execute an operating system that provides a user interface (UI), wherein the UI is configured to provide a prompt to a user and to receive user permission in response to the prompt as a condition of performing the temporary DDS switch.
23. The UE of clauses 19-22, where the modem is further configured to:
buffer a first permanent DDS switch recommendation; and
clear the first permanent DDS switch recommendation in response to generating a second permanent DDS switch recommendation that is different from the first permanent DDS switch recommendation.
24. The UE of clause 23, wherein the modem is configured to buffer the first permanent DDS switch recommendation in response to determining that a voice call has started on the second SIM.
25. The UE of clause 23, where the modem is further configured to:
send a temporary DDS switch back recommendation to the processor;
receive a request for a temporary DDS switch back; and
perform the temporary DDS switch back.
25. The UE of clause 24, wherein the UE is configured to send the temporary DDS switch back recommendation in response to a voice call ending.
27. The UE of claims 19-24, wherein the modem is configured to perform the temporary DDS switch in response to a voice call beginning on the second SIM, which is designated as the not default data subscription (nDDS).
28. A user equipment (UE) comprising:
a first subscriber identity module (SIM) associated with a first service provider subscription and a second SIM associated with a second service provider subscription;
a modem configured to interface with a base station; and
a processor configured to interface with the modem and to access the first SIM and the second SIM, wherein the modem is further configured to:
operate in a Dual SIM Dual Active (DSDA) mode or a Dual SIM Dual Standby (DSDS) mode in which the first SIM is designated as a default data subscription (DDS); and
perform a temporary DDS switch;
receive a permanent DDS switch request from the processor; and
either reject the permanent DDS switch request or convert the temporary DDS switch into a permanent DDS switch in response to the permanent DDS switch request.
29. The method of clause 28, wherein the modem is configured to send a permanent DDS switch confirmation to the processor in response to converting the temporary DDS switch into the permanent DDS.

30. The method of clause 28, wherein the modem is further configured to:
confirm presence of a buffered DDS switch recommendation at the modem after rejecting the permanent DDS switch request;
convert the temporary DDS switch to a permanent DDS switch in response to the permanent DDS switch request from the processor; and
send a permanent DDS switch confirmation to the processor.

31. The method of clauses 28 and 30, wherein the modem is further configured to:
switch back the temporary DDS switch.

32. The method of clauses 28 and 30-31, wherein the processor is further configured to execute an operating system that provides a user interface (UI), wherein the UI is configured to provide a prompt to a user and to receive user permission in response to the prompt as a condition of performing the temporary DDS switch.

29. The method of clauses 28 and 30-32, where the modem is further configured to:
send a temporary DDS switch back recommendation to the processor;
receive a request for a temporary DDS switch back;
send a temporary DDS switch back recommendation to the processor; and
perform the temporary DDS switch back.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
    operating in a Dual SIM Dual Active (DSDA) mode or a Dual SIM Dual Standby (DSDS) mode in which a first subscriber identity module (SIM) is designated as a default data subscription (DDS);
    informing a user of a recommendation to change the DDS from the first SIM to a second SIM at a modem;
    changing the DDS in response to, at least in part, the recommendation and an input from the user, wherein changing the DDS comprises designating the second SIM as a temporary DDS or a permanent DDS;
    updating a first state variable to indicate a state of the DDS; and
    routing internet data to the second SIM.

2. The method of claim 1, wherein changing the DDS comprises designating the second SIM as a temporary DDS, and wherein the updating the first state variable includes updating a temporary DDS state variable to refer to the second SIM.

3. The method of claim 2, further comprising:
    changing the DDS back to the first SIM, including updating the temporary DDS state variable to be null.

4. The method of claim 2, further comprising:
    omitting to correspond with a base station to indicate capabilities of the second SIM.

5. The method of claim 1, wherein the changing the DDS comprises designating the second SIM as a permanent DDS, and wherein the updating the first state variable includes updating a permanent DDS state variable to refer to the second SIM, the method further including:
    updating a second state variable, including updating a temporary DDS state variable to be null.

6. The method of claim 5, further comprising:
    corresponding with a base station to indicate capabilities of the second SIM.

7. The method of claim 1, wherein the first state variable is part of a set of state variables including:
    a permanent DDS state variable having two possible states, one for the first SIM and one for the second SIM; and
    a temporary DDS state variable having three possible states, one for the first SIM, one for the second SIM, and a null value,
    wherein the temporary DDS state variable overrides the permanent DDS state variable unless the temporary DDS state variable has the null value.

8. The method of claim 7, wherein the first state variable is the temporary DDS state variable, the method further comprising:
    determining an actual DDS in use, including confirming that the temporary DDS state variable refers to the second SIM.

9. The method of claim 7, wherein the first state variable is the permanent DDS state variable, the method further comprising:
    determining an actual DDS in use, including confirming that the temporary DDS state variable has the null value.

10. A user equipment (UE), comprising:

one or more memories; and one or more processors coupled to the one or more memories, the one or more memories storing instructions that are executable by the one or more processors, configured individually or in any combination, to cause the UE to:

operate in a Dual SIM Dual Active (DSDA) mode or a Dual SIM Dual Standby (DSDS) mode in which a first subscriber identity module (SIM) is designated as a default data subscription (DDS);

inform a user of a recommendation to change the DDS from the first SIM to a second SIM at a modem;

change the DDS in response to, at least in part, the recommendation and an input from the user, wherein changing the DDS comprises designating the second SIM as a temporary DDS or a permanent DDS;

update a first state variable to indicate a state of the DDS; and route internet data to the second SIM.

11. The UE of claim 10, wherein changing the DDS comprises designating the second SIM as a temporary DDS, and wherein the updating the first state variable includes updating a temporary DDS state variable to refer to the second SIM.

12. The UE of claim 11, wherein the one or more processors are further configured, individually or in any combination, to cause the UE to:

change the DDS back to the first SIM, including updating the temporary DDS state variable to be null.

13. The UE of claim 11, wherein the one or more processors are further configured, individually or in any combination, to cause the UE to:

omit to correspond with a base station to indicate capabilities of the second SIM.

14. The UE of claim 10, wherein the changing the DDS comprises designating the second SIM as a permanent DDS, wherein the updating the first state variable includes updating a permanent DDS state variable to refer to the second SIM, and wherein the one or more processors are further configured, individually or in any combination, to cause the UE to:

update a second state variable, including updating a temporary DDS state variable to be null.

15. The UE of claim 14, wherein the one or more processors are further configured, individually or in any combination, to cause the UE to:

correspond with a base station to indicate capabilities of the second SIM.

16. The UE of claim 10, wherein the first state variable is part of a set of state variables including:

a permanent DDS state variable having two possible states, one for the first SIM and one for the second SIM; and a temporary DDS state variable having three possible states, one for the first SIM, one for the second SIM, and a null value, wherein the temporary DDS state variable overrides the permanent DDS state variable unless the temporary DDS state variable has the null value.

\* \* \* \* \*